United States Patent
Yamamoto et al.

(10) Patent No.: US 11,079,891 B2
(45) Date of Patent: Aug. 3, 2021

(54) TOUCH SCREEN DEVICE

(71) Applicant: Mitsubishi Electric Corporation, Tokyo (JP)

(72) Inventors: Akihito Yamamoto, Tokyo (JP); Yuichi Sasaki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/938,631

(22) Filed: Jul. 24, 2020

(65) Prior Publication Data
US 2020/0356216 A1 Nov. 12, 2020

Related U.S. Application Data

(63) Continuation of application No. PCT/JP2018/003138, filed on Jan. 31, 2018.

(51) Int. Cl.
*G06F 3/044* (2006.01)
*G06F 3/041* (2006.01)

(52) U.S. Cl.
CPC .......... *G06F 3/0446* (2019.05); *G06F 3/0414* (2013.01); *G06F 3/0418* (2013.01); *G06F 2203/04104* (2013.01); *G06F 2203/04106* (2013.01)

(58) Field of Classification Search
CPC .... G06F 3/0446; G06F 3/0414; G06F 3/0418; G06F 2203/04104; G06F 2203/04106; G06F 2203/04105; G06F 3/04186; G06F 3/044
See application file for complete search history.

(56) References Cited

U.S. PATENT DOCUMENTS 6,492,979 B1   12/2002   Kent et al.
6,504,530 B1 *  1/2003   Wilson ................ G06F 3/04186
                                                                345/173
(Continued)

FOREIGN PATENT DOCUMENTS

JP   2000-305623 A   11/2000
JP   2014-26466 A    2/2014
(Continued)

*Primary Examiner* — Amy Onyekaba
(74) *Attorney, Agent, or Firm* — Birch, Stewart, Kolasch & Birch, LLP.

(57) ABSTRACT

A touch screen device includes: a touch screen that includes an operation surface on which touch operations are performed, and in which capacitances change at regions of the operation surface touched by conductors; a pressure sensor unit to output a signal corresponding to a pressing value of a pressing force applied to the operation surface; and a controller to calculate coordinates indicating positions of the touch operations on the operation surface based on the capacitances. The touch operations include first and second touch operations. The controller determines touch operation information input by the second touch operation to be valid when a condition is satisfied, and determines the touch operation information to be invalid when the condition is not satisfied. The condition is that the first touch operation is being performed and a pressing value of a pressing force of the first touch operation is within a predetermined reference pressure range.

24 Claims, 16 Drawing Sheets

(56) References Cited

U.S. PATENT DOCUMENTS

| | | | | |
|---|---|---|---|---|
| 8,698,774 B2* | 4/2014 | Mamba | | G06F 3/0446 |
| | | | | 345/174 |
| 8,786,560 B1* | 7/2014 | Khafizov | | G06F 3/0433 |
| | | | | 345/173 |
| 9,052,772 B2* | 6/2015 | West | | G06F 3/0416 |
| 9,619,056 B1* | 4/2017 | Khafizov | | G06F 3/0418 |
| 10,120,506 B2* | 11/2018 | Chen | | G06F 3/0416 |
| 10,254,889 B1* | 4/2019 | Khafizov | | G06F 3/041 |
| 10,275,087 B1* | 4/2019 | Smith | | G06F 3/013 |
| 10,289,249 B2* | 5/2019 | Akita | | G06K 9/00416 |
| 10,365,758 B1* | 7/2019 | Smith | | G06F 3/0412 |
| 2012/0092299 A1* | 4/2012 | Harada | | H04N 21/4316 |
| | | | | 345/174 |
| 2013/0201155 A1* | 8/2013 | Wu | | G06F 3/044 |
| | | | | 345/174 |
| 2013/0207913 A1* | 8/2013 | Takashima | | G06F 3/04883 |
| | | | | 345/173 |
| 2014/0028593 A1* | 1/2014 | Hirata | | G06F 3/04144 |
| | | | | 345/173 |
| 2014/0340321 A1* | 11/2014 | Chang | | G06F 3/0418 |
| | | | | 345/173 |
| 2014/0368260 A1* | 12/2014 | Tanada | | G06F 3/04883 |
| | | | | 327/517 |
| 2015/0160778 A1* | 6/2015 | Kim | | G06F 3/0445 |
| | | | | 345/174 |
| 2015/0301684 A1* | 10/2015 | Shimamura | | G06F 3/04186 |
| | | | | 345/174 |
| 2016/0062533 A1 | 3/2016 | O'Connor | | |
| 2016/0253041 A1* | 9/2016 | Park | | G06F 3/0445 |
| | | | | 345/174 |
| 2016/0274784 A1* | 9/2016 | Yui | | B25J 9/1658 |
| 2016/0291697 A1* | 10/2016 | Jules | | G06F 3/041 |
| 2016/0313859 A1* | 10/2016 | Bamba | | G06F 3/0488 |
| 2017/0097733 A1* | 4/2017 | Edgar | | G06F 3/0445 |
| 2017/0108992 A1* | 4/2017 | Lee | | G06F 3/04186 |
| 2017/0285870 A1* | 10/2017 | Wang | | G06F 3/0412 |
| 2018/0059866 A1* | 3/2018 | Drake | | G06F 3/0446 |
| 2018/0081493 A1* | 3/2018 | Wang | | G06F 3/0418 |
| 2018/0253041 A1 | 9/2018 | Park et al. | | |
| 2019/0310750 A1* | 10/2019 | Okada | | G06F 3/04883 |
| 2020/0285367 A1* | 9/2020 | Huang | | G06F 3/0446 |
| 2020/0333938 A1* | 10/2020 | Kirisken | | G06F 3/0418 |

FOREIGN PATENT DOCUMENTS

| | | | |
|---|---|---|---|
| JP | WO2014115808 | * | 7/2014 |
| JP | 2014-142813 A | | 8/2014 |
| JP | 2014-241086 A | | 12/2014 |
| JP | 2016-175175 A | | 10/2016 |
| JP | 2016-206897 A | | 12/2016 |

* cited by examiner

REVERSE CALCULATION CONVERSION

| INPUT | | | OUTPUT |
|---|---|---|---|
| PRESSING VALUE AFTER CHANGE $Fp'$ | PRESSED COORDINATES $(x1, y1)$ | PRESSED COORDINATES $(x2, y2)$ | PRESSING VALUE BEFORE CHANGE $Fp$ |
| | FIRST TOUCH OPERATION (RELEASE OBJECT) | SECOND TOUCH OPERATION (INPUT OBJECT) | |
| 600 | (480, 240) | (554, 1258) | 150 |
| 450 | (1172, 547) | (543, 987) | 366 |
| 586 | (324, 1564) | (557, 870) | 258 |
| . | . | . | . |
| . | . | . | . |
| . | . | . | . |

TOUCH SCREEN DEVICE

CROSS REFERENCE TO RELATED APPLICATION

This application is a continuation of International Application No. PCT/JP2018/003138, filed on Jan. 31, 2018, the disclosure of which is incorporated herein by reference in its entirety.

BACKGROUND OF THE INVENTION

1. Field of the Invention

The present invention relates to a touch screen device including an electrostatic capacitive touch screen.

2. Description of the Related Art

There is proposed an electronic device including a pressing sensor unit that detects an externally applied pressing force, a touch screen that outputs a signal corresponding to a touch position touched by an operation body, and a determiner that determines whether to validate the signal output from the touch screen on the basis of a pressing transition time obtained from the pressing sensor unit (see, e.g., Patent Literature 1). The pressing transition time is a time from when a pressing is started until the pressing force reaches a threshold value.

Patent Literature 1: Japanese Patent Application Publication No. 2014-142813

However, since the conventional electronic device determines whether to validate or invalidate the signal output from the touch screen on the basis of the pressing transition time from the pressing sensor unit, which is disposed on a side of the housing, it is possible that when an operator unintentionally performs a touch operation, touch operation information input by the touch operation is determined to be valid, and an operation signal corresponding to the touch operation is output.

SUMMARY OF THE INVENTION

The present invention has been made to solve the above conventional problem, and is intended to provide a touch screen device that reliably prevent output of an operation signal based on an unintentional touch operation by the operator.

A touch screen device according to an aspect of the present invention includes: a touch screen that includes an operation surface on which touch operations are performed, and in which electrostatic capacitances change at regions of the operation surface touched by conductors; a pressure sensor unit to output a pressure detection signal corresponding to a pressing value of a pressing force applied to the operation surface; and a controller to calculate coordinates indicating positions of the touch operations on the operation surface on a basis of the electrostatic capacitances, wherein the touch operations include a first touch operation on the operation surface and a second touch operation on the operation surface, wherein the controller determines touch operation information input by the second touch operation to be valid when a first condition is satisfied, and determines the touch operation information input by the second touch operation to be invalid when the first condition is not satisfied, wherein the first condition is that the first touch operation is being performed and a pressing value of a pressing force of the first touch operation is within a predetermined reference pressure range having an upper limit and a lower limit, and wherein the controller previously stores a reverse calculation conversion table used to obtain a pressing value of a pressing force of the first touch operation before the second touch operation is performed, from coordinates of a position of the first touch operation, coordinates of a position of the second touch operation, and a pressing value of a sum of pressing forces of the first touch operation and the second touch operation, and uses, as the pressing value of the pressing force of the first touch operation before the second touch operation is performed, the pressing value obtained using the reverse calculation conversion table to determine whether the touch operation information input by the second touch operation is valid.

A touch screen device according to another aspect of the present invention includes: a touch screen that includes an operation surface on which touch operations are performed, and in which electrostatic capacitances change at regions of the operation surface touched by conductors; a pressure sensor unit to output a pressure detection signal corresponding to a pressing value of a pressing force applied to the operation surface; and a controller to calculate coordinates indicating positions of the touch operations on the operation surface on a basis of the electrostatic capacitances, wherein the touch operations include a first touch operation on the operation surface and a second touch operation on the operation surface, wherein the controller determines touch operation information input by the second touch operation to be valid when a first condition is satisfied, and determines the touch operation information input by the second touch operation to be invalid when the first condition is not satisfied, wherein the first condition is that the first touch operation is being performed and a pressing value of a pressing force of the first touch operation is within a predetermined reference pressure range having an upper limit and a lower limit, and wherein the controller, when a change in the pressing value of the pressing force of the first touch operation per unit time is within a predetermined specific range, corrects a first threshold value that is the lower limit of the reference pressure range and a second threshold value that is the upper limit of the reference pressure range according to the change in the pressing value per unit time so that the pressing value of the pressing force of the first touch operation is not outside the reference pressure range, and determines the reference pressure range with the corrected first threshold value and the corrected second threshold value.

With the present invention, it is possible to reliably prevent output of an operation signal based on an unintentional touch operation by the operator.

DETAILED DESCRIPTION OF THE INVENTION

Hereinafter, touch screen devices according to embodiments of the present invention will be described with reference to the attached drawings. The following embodiments are merely examples, and can be modified in various ways within the scope of the present invention.

The touch screen devices according to the embodiments provide functions of deadman switches (also referred to as "deadman devices"). Deadman switch is a generic term for a device that is off when no force is applied by an operator, is on only when an appropriate force is applied by the operator, and is off when an excessive force is applied by the operator, for example. By using a touch screen device having such a function, in operation of an operation target device, such as an industrial device, it is possible to reliably place the operation target device in a desired state (e.g., a stopped state) when an abnormal event occurs in the operator and the operator takes a hand off a touch screen or when an abnormal event occurs in the operator and the operator presses the touch screen very strongly.

<<1>> First Embodiment

Figure 1:
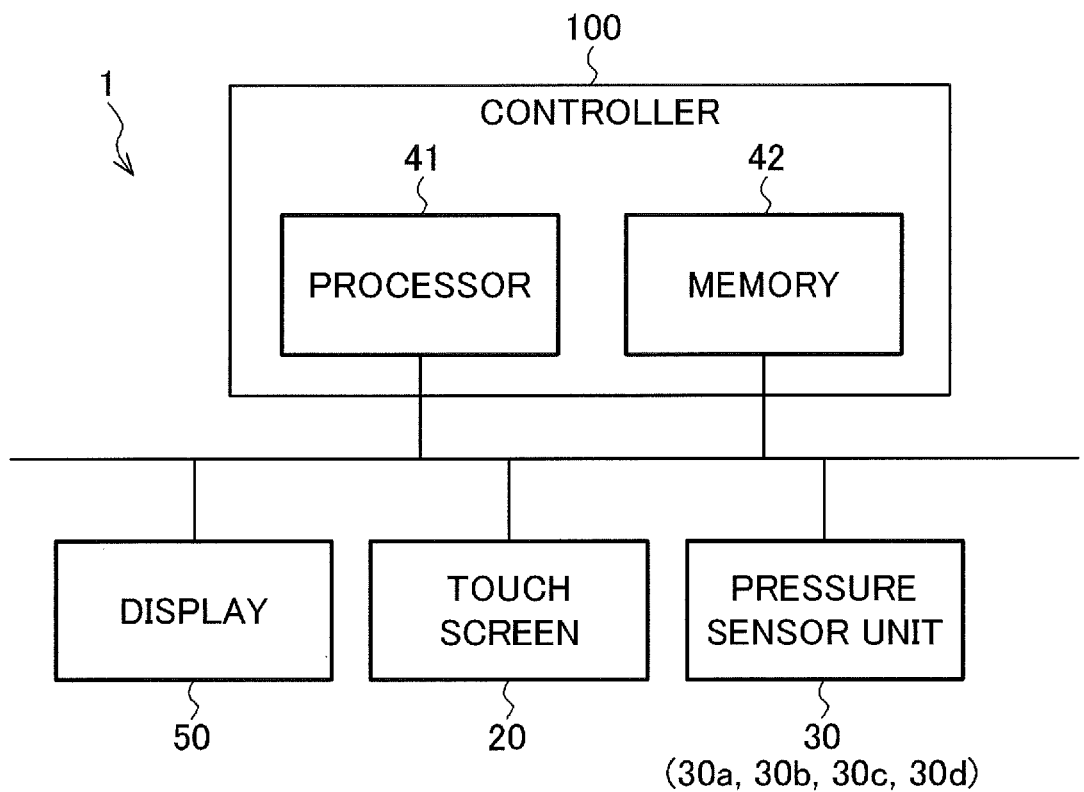
FIG. 1 is a diagram illustrating an example of a hardware configuration of a touch screen device according to a first embodiment of the present invention.

FIG. 1 is a diagram illustrating an example of a hardware configuration of a touch screen device 1 according to a first embodiment. As illustrated in FIG. 1, the touch screen device 1 includes an electrostatic capacitive touch screen 20, a pressure sensor unit 30 that detects a pressing force applied to an operation surface of the touch screen 20, and a controller 100. The touch screen 20 includes a display that is placed on the operation surface on which touch operations (also referred to as "touch gesture operations" or "touch input operations) are performed, and that displays user interface (UI) images, such as operation components (e.g., icons). The touch screen device 1 may include a display 50 that displays information based on results of the touch operations.

The controller 100 includes, for example, a processor 41 as an information processor, and a memory 42 as a storage that stores information. The processor 41 controls the entire operation of the touch screen device 1 by executing a program stored in the memory 42. The whole or part of the controller 100 may be control circuitry formed by semiconductor integrated circuitry. The memory 42 may include various storage devices, such as a semiconductor memory, a hard disk drive, or a device that records information on a removable recording medium. The memory 42 may store conductor touch information obtained from the touch screen 20 and pressure information obtained from the pressure sensor unit 30.

The controller 100 performs a process corresponding to a touch operation input on the operation surface of the touch screen 20. Specifically, the controller 100 performs a process based on a change in electrostatic capacitance corresponding to a touch operation input on the operation surface of the touch screen 20 and a pressure detection signal output from the pressure sensor unit 30 in response to the pressing force applied to the operation surface. For example, the controller 100 transmits an operation signal corresponding to a touch operation input on the operation surface of the touch screen 20, to another device connected to the touch screen device 1 or another device capable of communicating with the touch screen device 1. The other device is, for example, an external device, such as production equipment, a vehicle, or a home electric appliance.

Figure 2:
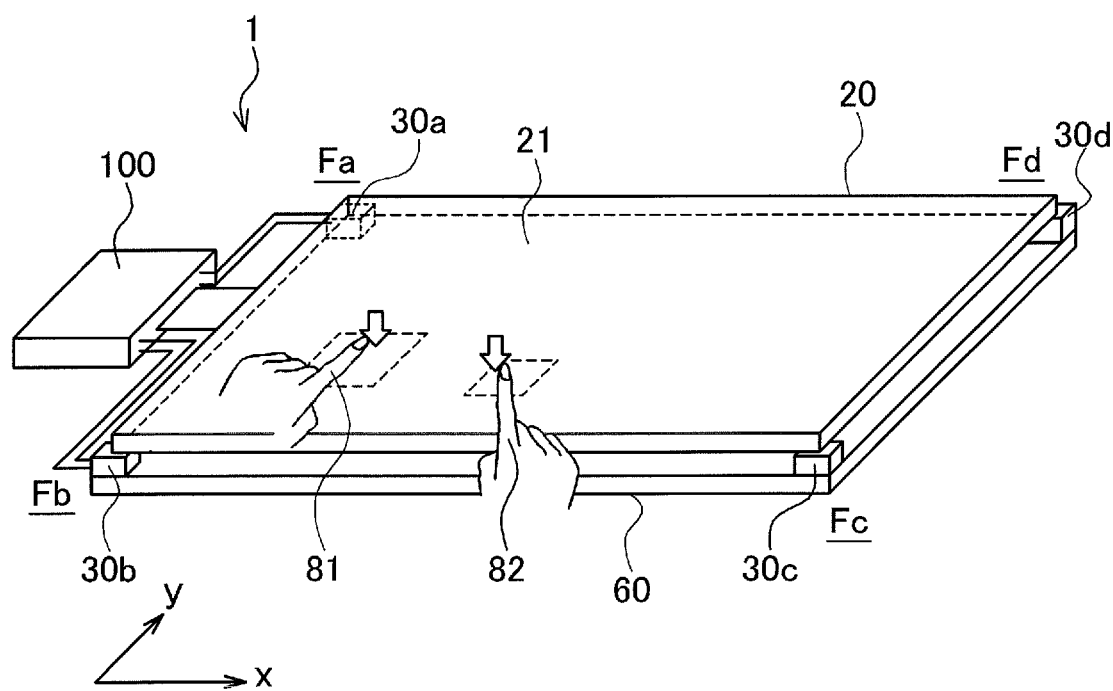
FIG. 2 is a perspective view schematically illustrating an example of a structure of the touch screen device according to the first embodiment.

FIG. 2 is a perspective view schematically illustrating an example of a structure of the touch screen device 1. As illustrated in FIG. 2, the touch screen device 1 includes a substrate 60 and four pressure sensors 30a, 30b, 30c, and 30d that support the touch screen 20 over the substrate 60. The substrate 60 may be part of a housing of the touch screen device 1. Although in FIG. 2 the controller 100 is depicted outside the touch screen 20, the controller 100 may be part of the substrate 60 or part of a circuit board mounted on the substrate 60. In FIG. 2, the pressure sensors 30a, 30b, 30c, and 30d support four corners of the touch screen 20, which is quadrangular in plan view. The pressure sensors 30a, 30b, 30c, and 30d of FIG. 2 constitute the pressure sensor unit 30 of FIG. 1. The pressure sensors 30a, 30b, 30c, and 30d may support the touch screen 20 at positions other than the corners. The touch screen 20 may have a shape that is not quadrangular, in plan view. The number of pressure sensors supporting the touch screen 20 may be three or less or five or more.

As illustrated in FIG. 2, the touch screen 20 includes the operation surface 21, on which touch operations are performed by the operator. When the operation surface 21 is touched by a conductor (or conductive body), an electrostatic capacitance at the region touched by the conductor changes. Examples of the conductor include fingers 81 and 82, and operation aids, such as styluses, formed by conductor. The controller 100 detects electrostatic capacitances at respective positions of the operation surface 21, and obtains the position (or two-dimensional coordinates on the operation surface 21) of the conductor touch region. Specifically, the controller 100 calculates touch position coordinates indicating the position of the conductor touch region on the operation surface 21, on the basis of the electrostatic capacitances at the respective positions of the operation surface 21 of the touch screen 20. The conductor touch region is, for example, a region where an electrostatic capacitance is greater than a predetermined threshold capacitance ThC. The conductor touch region is an "electrostatic capacitance change region." The touch position coordinates indicating the position of the conductor touch region are also referred to as "electrostatic capacitance coordinates."

A pressing force applied to the operation surface 21 of the touch screen 20 is detected by the pressure sensors 30a, 30b, 30c, and 30d. The pressure sensors 30a, 30b, 30c, and 30d output pressure detection signals indicating pressure values Fa, Fb, Fc, and Fd depending on a pressing value Fp, which is the magnitude of the pressing force applied to the operation surface 21, and the pressed position. The controller 100 can calculate the pressing value Fp on the basis of the pressure values Fa, Fb, Fc, and Fd indicated by the pressure detection signals output from the pressure sensors 30a, 30b, 30c, and 30d. The controller 100 can also calculate, from the pressure values Fa, Fb, Fc, and Fd, touch position coordinates indicating the pressed position on the operation surface 21. The touch position coordinates calculated from the pressure values Fa, Fb, Fc, and Fd are also referred to as "pressure coordinates."

Figure 3:
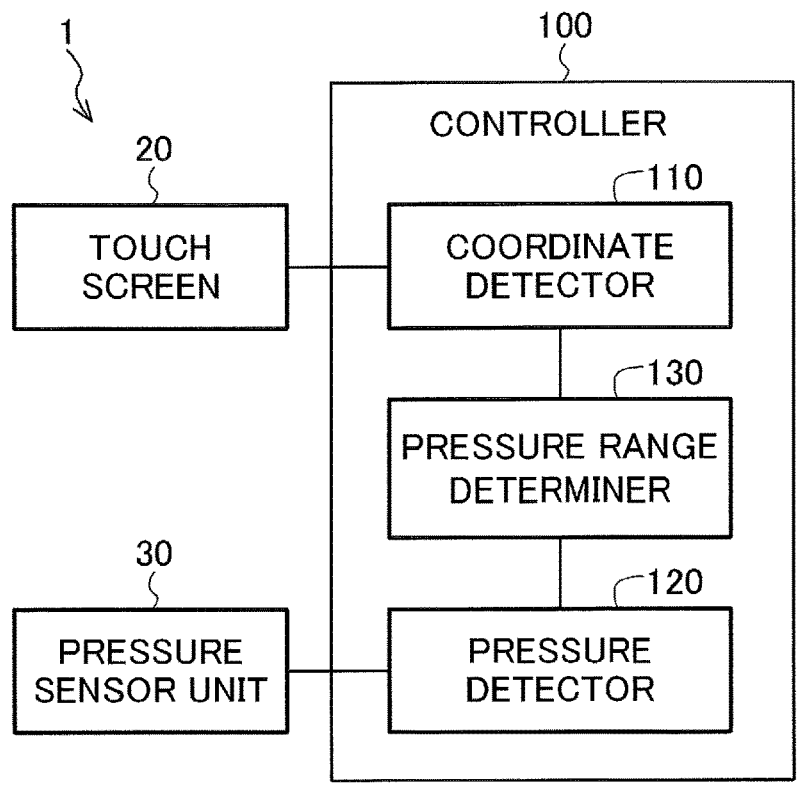
FIG. 3 is a functional block diagram schematically illustrating the touch screen device according to the first embodiment.

FIG. 3 is a functional block diagram schematically illustrating the touch screen device 1 according to the first embodiment. In FIG. 3, elements that are the same as or correspond to those illustrated in FIG. 1 are given the same reference characters as those shown in FIG. 1. As illustrated in FIG. 3, the controller 100 includes a coordinate detector 110, a pressure detector 120, and a pressure range determiner 130. Operation components are displayed on the operation surface 21 of the touch screen 20. The touch operations include a first touch operation and a second touch operation. The first touch operation is performed by, for example, the finger 81, and the second touch operation is performed by, for example, the finger 82. The first touch operation may be an operation using a first operation component (e.g., a lock release object) displayed on the operation surface 21. The second touch operation may be an operation using a second operation component (e.g., an input object) displayed on the operation surface 21.

The coordinate detector 110 detects the presence or absence of touch of a conductor on the operation surface 21 by detecting the electrostatic capacitances at the respective positions of the operation surface 21 of the touch screen 20. On the basis of the detection values of the electrostatic capacitances, the coordinate detector 110 calculates touch position coordinates that are coordinates of a conductor touch region that is a region where the detection value of an electrostatic capacitance is greater than the predetermined threshold capacitance ThC. The coordinate detector 110 provides the touch position coordinates to the pressure range determiner 130.

The pressure detector 120 receives the pressure detection signals output from the pressure sensors 30a, 30b, 30c, and 30d constituting the pressure sensor unit 30, and provides the pressure values Fa, Fb, Fc, and Fd indicated by the pressure detection signals to the pressure range determiner 130.

The pressure range determiner 130 determines touch operation information input by the second touch operation to be valid when a first condition that the first touch operation is being performed and the pressing value Fp is within a predetermined reference pressure range is satisfied, and determines the touch operation information input by the second touch operation to be invalid when the first condition is not satisfied. Thus, when the second touch operation is performed while the first condition is satisfied, the pressure range determiner 130 outputs an operation signal based on the second touch operation to an external device, but when the second touch operation is performed while the first condition is not satisfied, the pressure range determiner 130 does not output the operation signal to the external device.

Figure 4:
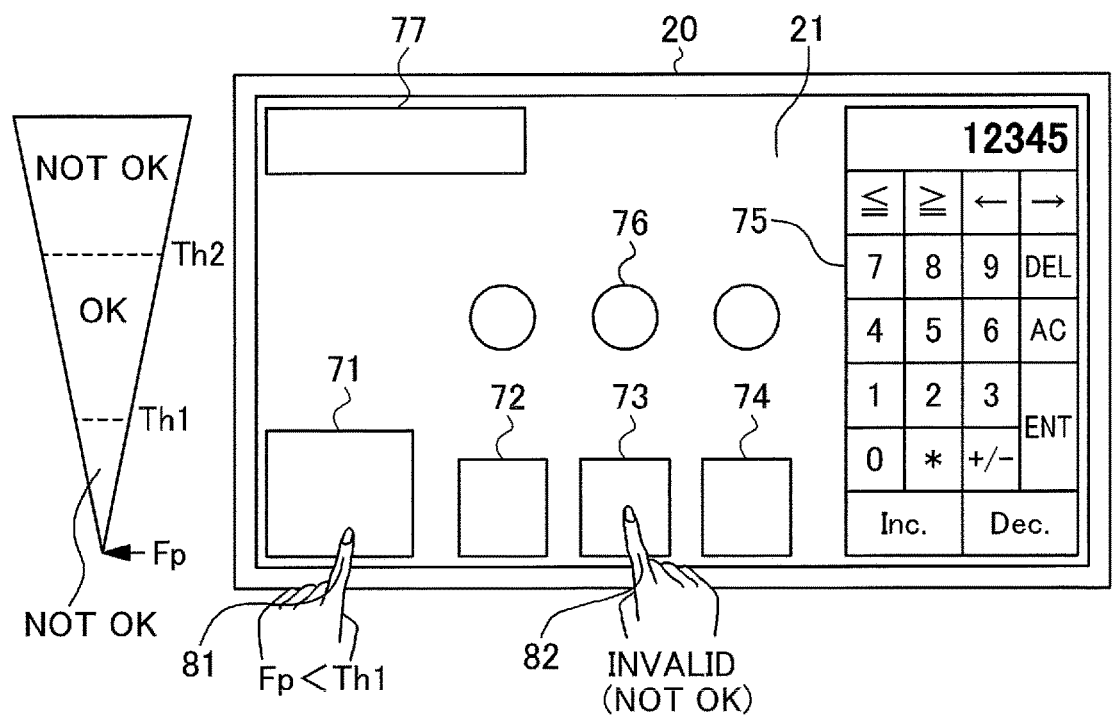
FIG. 4 is a (first) explanatory diagram illustrating an operation of the touch screen device according to the first embodiment.
Figure 5:
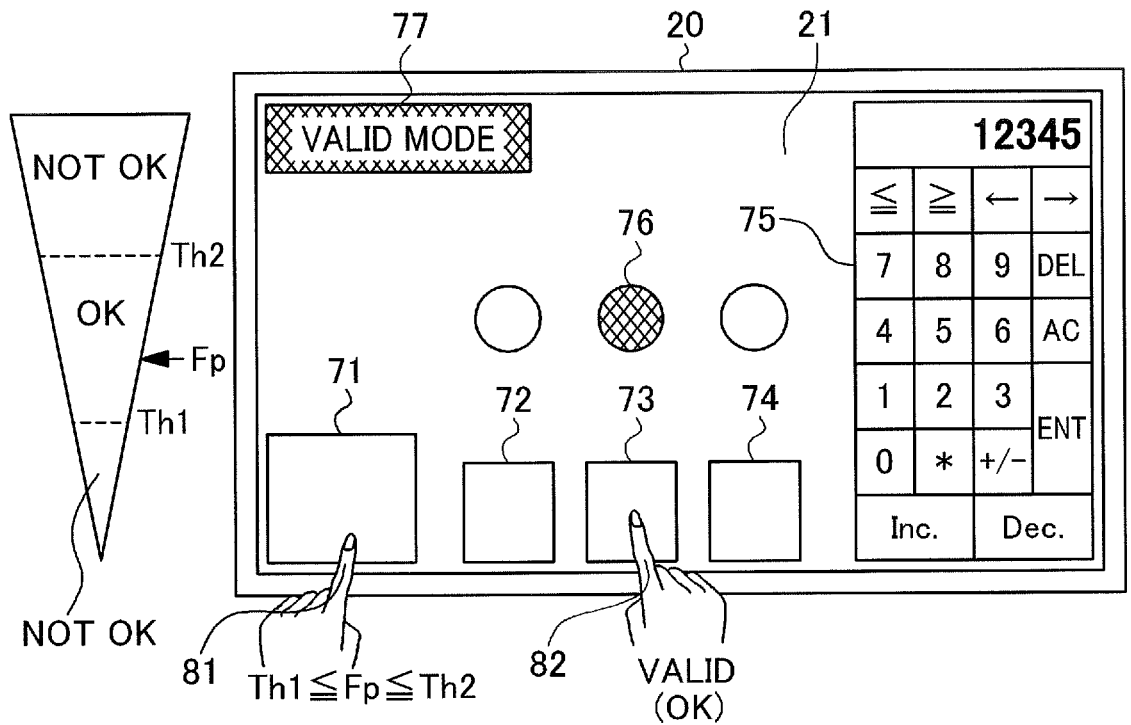
FIG. 5 is a (second) explanatory diagram illustrating an operation of the touch screen device according to the first embodiment.
Figure 6:
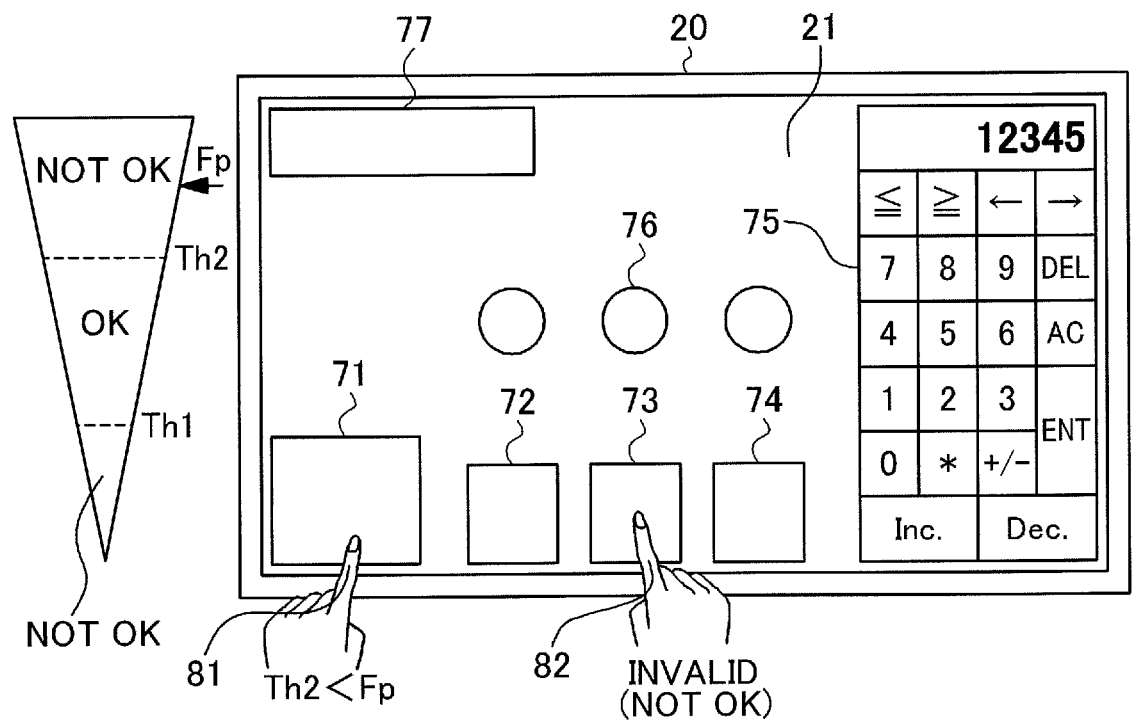
FIG. 6 is a (third) explanatory diagram illustrating an operation of the touch screen device according to the first embodiment.

FIGS. 4 to 6 are (first to third) explanatory diagrams illustrating operations of the touch screen device 1 according to the first embodiment. Each of FIGS. 4 to 6 illustrates, on the right side, an example of a UI screen on the operation surface 21 of the touch screen 20, and illustrates, on the left side, the pressing value Fp of the pressing force and first and second threshold values Th1 and Th2 that are a lower limit (or lower boundary value) and an upper limit (or upper boundary value) of the predetermined pressure range.

As illustrated in FIGS. 4 to 6, the operation surface 21 of the touch screen 20 displays, for example, a lock release object 71 as a release button for releasing an input restriction function that is a function of determining the touch operation information input by the second touch operation to be invalid, input objects 72 to 74 and 75 as input buttons on which the second touch operation is performed, and display objects 76 and 77 as indicator lamps and a display portion.

FIG. 4 illustrates a case where the pressing value Fp is less than the first threshold value Th1 (i.e., Fp<Th1). In this case, the pressure range determiner 130 determines that touch operation information input by pressing of the input objects 72 to 74 by the second touch operation of the finger 82 is invalid, and outputs no operation signal based on the operation of the input objects 72 to 74.

FIG. 5 illustrates a case where pressing by the first touch operation is being performed and the pressing value Fp is not less than the first threshold value Th1 and not greater than the second threshold value Th2 (i.e., Th1≤Fp≤Th2). In this case, the pressure range determiner 130 determines that touch operation information input by pressing of the input objects 72 to 74 by the second touch operation of the finger 82 is valid, and outputs an operation signal based on the operation of the input objects 72 to 74. The display object 76 corresponding to an input object on which the second touch operation has been performed is turned on, and the display object 77 displays information regarding the operation, e.g., that the current operation mode is a "valid mode."

FIG. 6 illustrates a case where pressing by the first touch operation is being performed and the pressing value Fp is greater than the second threshold value Th2 (i.e., Th2<Fp). In this case, the pressure range determiner 130 determines that touch operation information input by pressing of the input objects 72 to 74 by the second touch operation of the finger 82 is invalid, and outputs no operation signal based on the operation of the input objects 72 to 74.

FIGS. 4 to 6 each illustrates an example where the first touch operation by the finger 81 is being performed on the lock release object 71. However, the first touch operation may be performed on another position on the operation surface 21. It is also possible that the lock release object 71 is not displayed.

Figure 7:
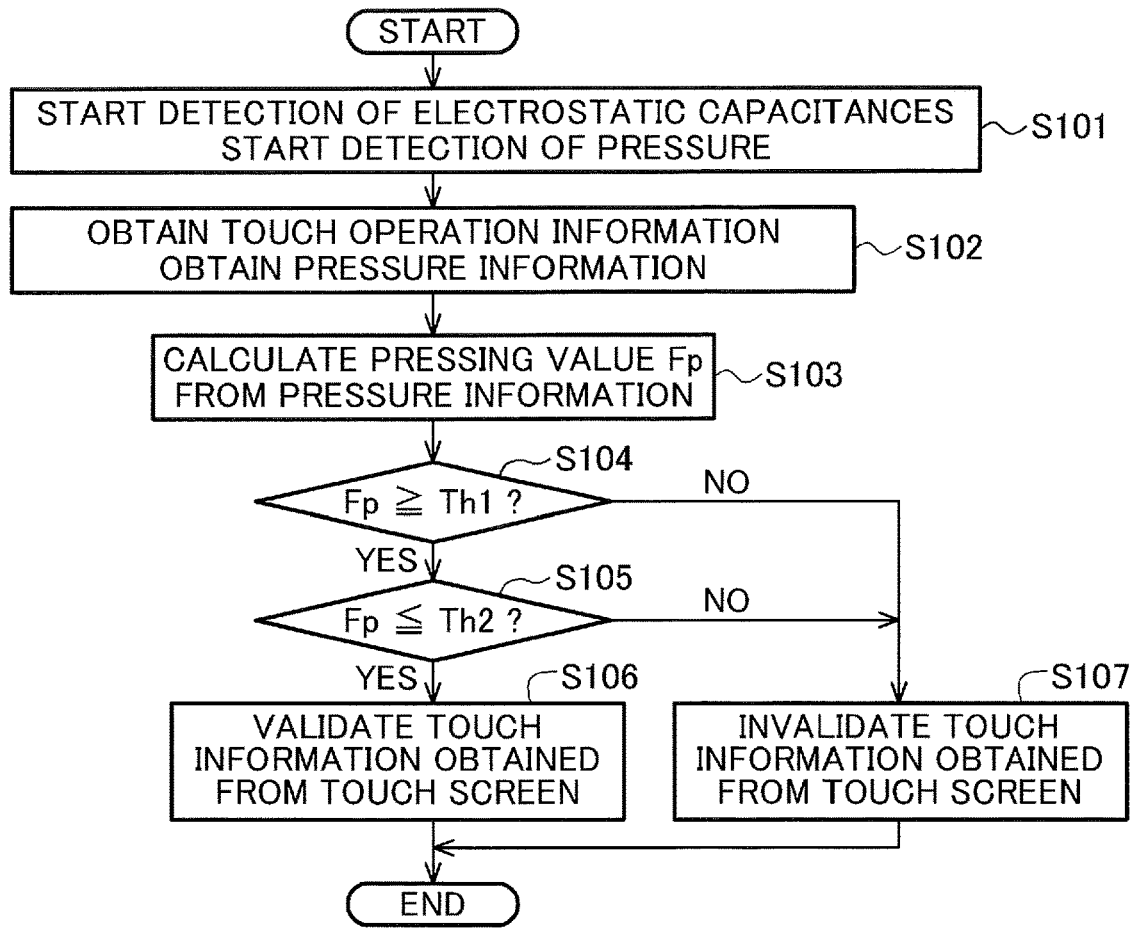
FIG. 7 is a flowchart illustrating an operation of the touch screen device according to the first embodiment.

FIG. 7 is a flowchart illustrating an operation of the touch screen device 1 according to the first embodiment.

In step S101, the coordinate detector 110 of the controller 100 starts detecting the electrostatic capacitances at the respective positions of the operation surface 21 of the touch screen 20, and the pressure detector 120 of the controller 100 starts obtaining the pressure detection signals based on the pressing value Fp from the pressure sensor unit 30.

In step S102, the pressure range determiner 130 of the controller 100 obtains touch operation information (e.g., coordinates of a touch operation position, a touch state, or detection values of the electrostatic capacitances) from the coordinate detector 110, and obtains pressure information (e.g., the pressure values Fa to Fd, coordinates of a pressed position, or the like) from the pressure detector 120.

In step S103, the pressure range determiner 130 calculates the pressing value Fp from the obtained pressure information.

In step S104, the pressure range determiner 130 determines whether the pressing value Fp is not less than the first threshold value Th1 (i.e., Th1≤Fp). When the pressing value Fp is not less than the first threshold value Th1, the process proceeds to step S105. When the pressing value Fp is less than the first threshold value Th1 (i.e., Fp<Th1), the process proceeds to step S107.

In step S105, the pressure range determiner 130 determines whether the pressing value Fp is not greater than the second threshold value Th2 (i.e., Th1≤Fp≤Th2). When the pressing value Fp is not greater than the second threshold value Th2, the process proceeds to step S106. When the pressing value Fp is greater than the second threshold value Th2 (i.e., Th2<Fp), the process proceeds to step S107.

In step S106, the pressure range determiner 130 determines the touch operation information on the operation surface 21 of the touch screen 20 to be valid.

In step S107, the pressure range determiner 130 determines the touch operation information on the operation surface 21 of the touch screen 20 to be invalid.

As described above, (1) when no pressing value Fp is being applied to the operation surface 21 by the operator (when Fp<Th1), the touch screen device 1 according to the first embodiment is in an off state, i.e., an input restriction state (a "Not OK" state in the drawings) in which the touch operation information input by the second touch operation is determined to be invalid;

(2) only when an appropriate pressing value Fp is being applied to the operation surface 21 by the operator (when Th1≤Fp≤Th2), the touch screen device 1 according to the first embodiment is in an on state, i.e., an input restriction released state (an "OK" state in the drawings) in which the touch operation information input by the second touch operation is determined to be valid; and (3) when an excessive pressing value Fp is being applied to the operation surface 21 by the operator (when Th2<Fp), the touch screen device 1 according to the first embodiment is in the off state, i.e., the input restriction state (the "Not OK" state in the drawings) in which the touch operation information input by the second touch operation is determined to be invalid.

Thus, it is possible to reliably prevent output of an operation signal based on an unintentional touch operation by the operator.

Specifically, when the touch screen device 1 is used to operate an operation target device or external device, such as an industrial device, it is possible to reliably place the operation target device in a desired state (e.g., a stopped state) both when an abnormal event (e.g., a situation, such as a doze, in which the operator is not concentrating on the operation) occurs in the operator, prevents the operator from maintaining the first touch operation, and causes the operator to take the finger off the touch screen 20, and when an abnormal event (e.g., a situation in which the operator pays attention to something other than the operation, such as a situation in which the operator feels pain in a part of the body) occurs in the operator and causes the operator to perform the first touch operation with a very strong force.

<<2>> Second Embodiment

The touch screen device 1 according to the first embodiment determines the touch operation information input by the second touch operation to be valid when the pressing value Fp of pressing by the first touch operation against the operation surface 21 of the touch screen 20 is within the reference pressure range (i.e., within a range from the first threshold value Th1 to the second threshold value Th2). However, it is possible that the pressing value Fp increases and becomes outside the reference pressure range due to pressing multiple points and the touch operation information input by the touch operation is determined to be invalid. Thus, a touch screen device 2 according to a second embodiment determines the touch operation information input by the second touch operation to be valid during a period until a predetermined time has elapsed even when the pressing value Fp against the operation surface 21 becomes outside the reference pressure range. Otherwise, the second embodiment is the same as the first embodiment. Thus, the second embodiment will be described with reference to FIGS. 1, 2, and 4 to 6, described in the first embodiment.

Figure 8:
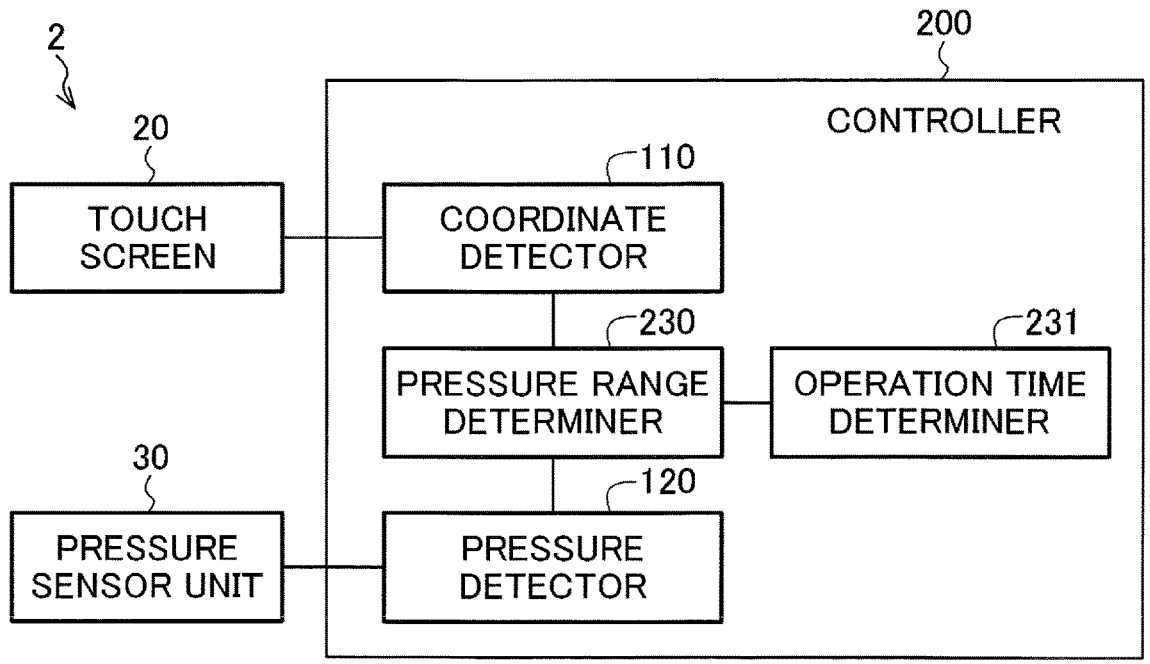
FIG. 8 is a functional block diagram schematically illustrating a touch screen device according to a second embodiment of the present invention.

FIG. 8 is a functional block diagram schematically illustrating the touch screen device 2 according to the second embodiment. In FIG. 8, elements that are the same as or correspond to those illustrated in FIG. 3 are given the same reference characters as those shown in FIG. 3. As illustrated in FIG. 8, the touch screen device 2 includes a touch screen 20, a pressure sensor unit 30, and a controller 200. The controller 200 includes a coordinate detector 110, a pressure detector 120, a pressure range determiner 230, and an operation time determiner 231.

The operation time determiner 231 previously holds an operable time t0 for which the restriction of input by the second touch operation is released. The operable time t0 is a predetermined time starting from when a pressing value Fp within the reference pressure range is applied by the first touch operation. The pressure range determiner 230 measures an elapsed time te from when it is determined that the pressing value Fp is within the predetermined reference pressure range. The operation time determiner 231 calculates a remaining operable time tr (=t0−te) by subtracting the elapsed time te from the operable time t0.

The pressure range determiner 230 determines the touch operation information input by the second touch operation to be valid when the remaining operable time tr is greater than zero (i.e., when tr>0). The pressure range determiner 230 determines the touch operation information input by the second touch operation to be invalid when the remaining operable time tr is not greater than zero (i.e., when t≤0). Thus, the pressure range determiner 230 determines the touch operation information input by the touch operation to be valid during a period in which the first touch operation is being performed and the elapsed time te from when the pressing value Fp becomes within the predetermined reference pressure range is not greater than the operable time t0.

As described above, the touch screen device 2 according to the second embodiment can provide the advantage described in the first embodiment, i.e., the advantage that it is possible to reliably prevent output of an operation signal corresponding to an unintentional second touch operation.

Further, with the touch screen device 2 according to the second embodiment, while the operation surface 21 is being pressed by the first touch operation (e.g., a touch operation by the finger 81) at a pressing value Fp within the reference pressure range, when the operation surface 21 is pressed by the second touch operation (e.g., a touch operation by the finger 82) and the pressing value Fp exceeds the reference pressure range, it is possible to determine the touch operation information input by the second touch operation to be valid during the operable time t0. Thus, the touch screen device 2 improves the operability of touch operation.

<<3>> Third Embodiment

The touch screen device 2 according to the second embodiment determines the touch operation information input by the second touch operation to be valid during the operable time t0. However, the operator may wish to perform the second touch operation while perceiving the remaining operable time tr. Thus, a touch screen device 3 according to a third embodiment has a function of displaying the remaining operable time tr. Otherwise, the third embodiment is the same as the second embodiment. Thus, the third embodiment will be described with reference to FIGS. 1, 2, and 4 to 6, described in the first and second embodiments.

Figure 9:
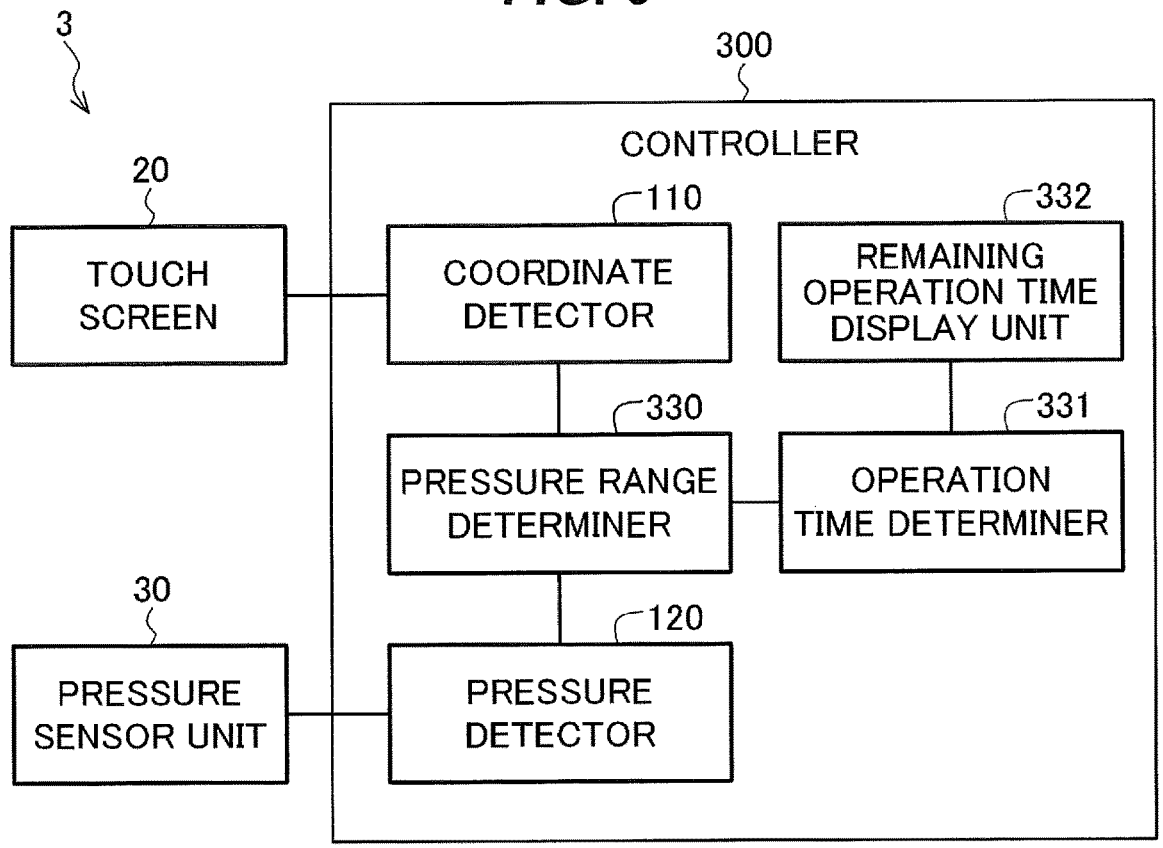
FIG. 9 is a functional block diagram schematically illustrating a touch screen device according to a third embodiment of the present invention.

FIG. 9 is a functional block diagram schematically illustrating the touch screen device 3 according to the third embodiment. In FIG. 9, elements that are the same as or correspond to those illustrated in FIG. 8 are given the same reference characters as those shown in FIG. 8. As illustrated in FIG. 9, the touch screen device 3 includes a touch screen 20, a pressure sensor unit 30, and a controller 300. The controller 300 includes a coordinate detector 110, a pressure detector 120, a pressure range determiner 330, an operation time determiner 331, and a remaining operation time display unit 332. The pressure range determiner 330 and operation time determiner 331 have the same functions as the pressure range determiner 230 and operation time determiner 231 of FIG. 8. The remaining operation time display unit 332 displays the remaining operable time tr in the display object 77. This allows the operator to perform touch operation at ease without rushing while perceiving the remaining operable time tr for input operation by the operator.

Figure 10:
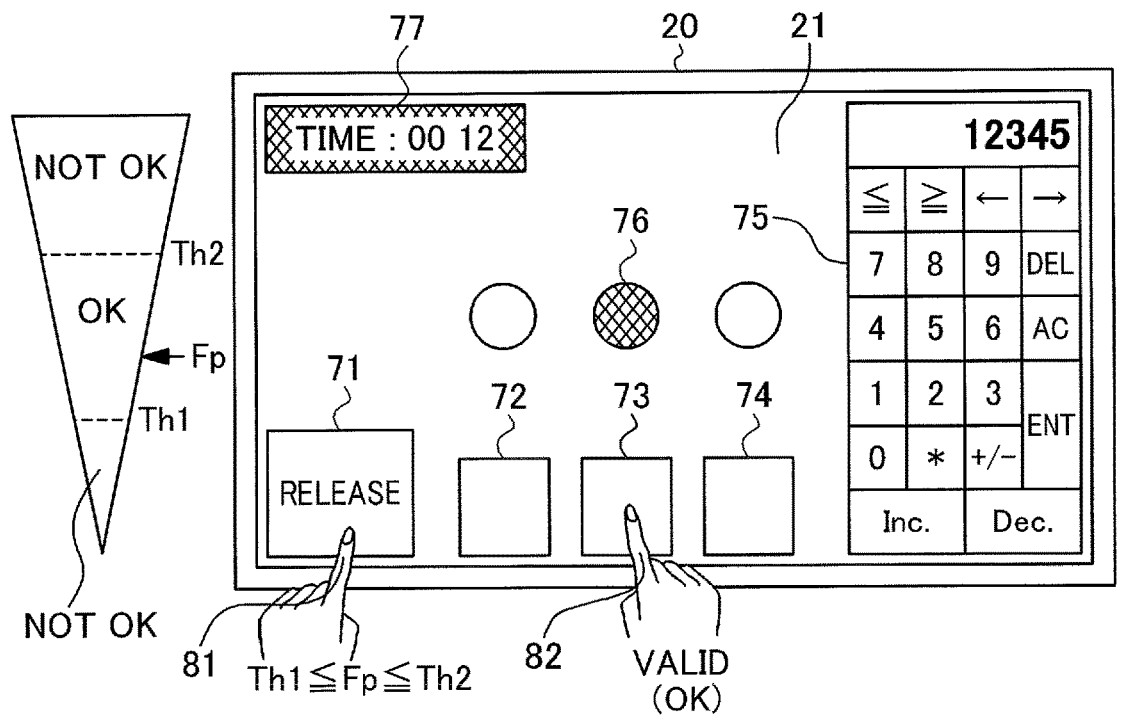
FIG. 10 is an explanatory diagram illustrating an operation of the touch screen device according to the third embodiment.

FIG. 10 is an explanatory diagram illustrating an operation of the touch screen device 3 according to the third embodiment. FIG. 10 illustrates, on the right side, an example of a UI screen of an operation surface 21 of the touch screen 20, and illustrates, on the left side, the pressing value Fp of the pressing force and the first and second threshold values Th1 and Th2 that are the lower and upper limits of the predetermined reference pressure range. In the third embodiment, the display object 77 displays that the remaining operable time is 12 seconds. The remaining operable time decreases as the elapsed time te increases.

As described above, the touch screen device 3 according to the third embodiment can provide the advantage described in the first embodiment, i.e., the advantage that it is possible to reliably prevent output of an operation signal corresponding to an unintentional second touch operation.

Further, the touch screen device 3 according to the third embodiment can provide, while the operation surface 21 is being pressed by the first touch operation at a pressing value Fp within the reference pressure range, the advantage described in the second embodiment, i.e., the advantage that the operability of touch operation can be improved.

Further, with the touch screen device 3 according to the third embodiment, since the remaining operable time tr is displayed in the display object 77 on the touch screen 20, the operator can perform the second touch operation at ease without rushing while taking into account the remaining operable time tr.

<<4>> Fourth Embodiment

The touch screen device 1 according to the first embodiment determines the touch operation information input by the touch operation to be valid when the pressing value Fp of the pressing force against the operation surface 21 of the touch screen 20 is within the reference pressure range. However, for example, when the pressing value Fp changes due to multiple touch operations, it is possible that the pressing value Fp is determined to be outside the reference pressure range and the touch operation information input by the second touch operation is determined to be invalid. Thus, a touch screen device 4 according to a fourth embodiment prevents the touch operation information input by the touch operation from being determined to be invalid due to change in the pressing value Fp caused by the second touch operation. Otherwise, the fourth embodiment is the same as the first embodiment. Thus, the fourth embodiment will be described with reference to FIGS. 1, 2, and 4 to 6, described in the first embodiment.

Figures 11, 12:
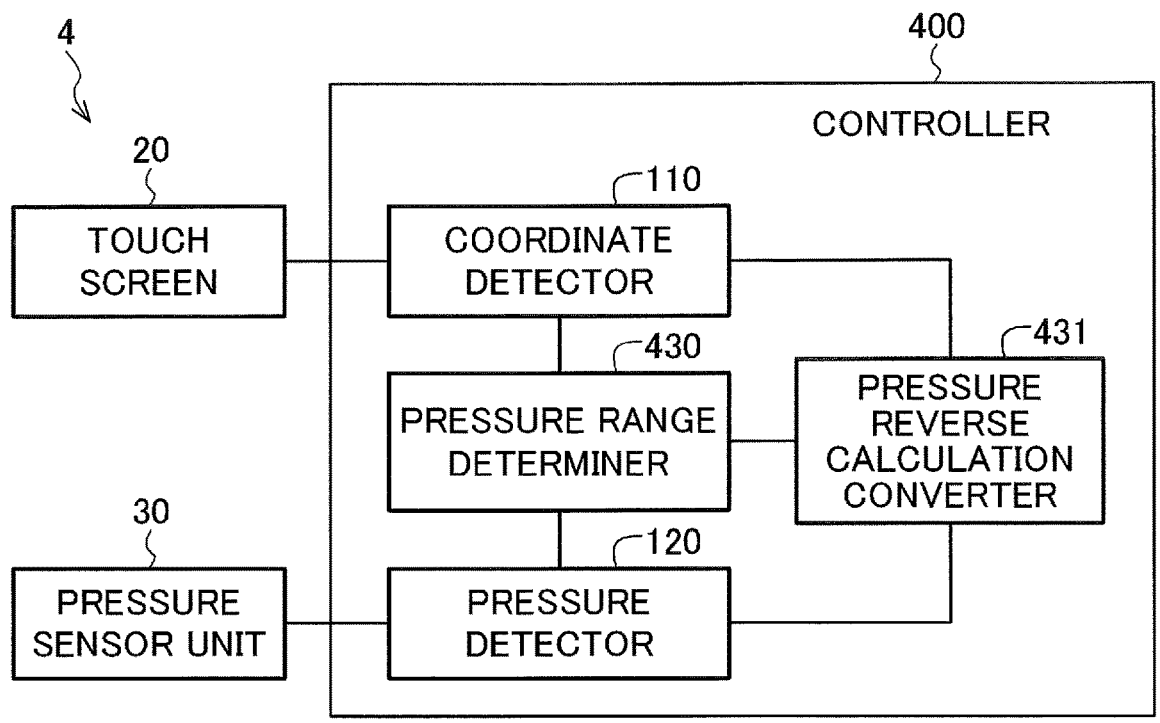
FIG. 11 is a functional block diagram schematically illustrating a touch screen device according to a fourth embodiment of the present invention.
FIG. 12 is a diagram illustrating an example of a reverse calculation conversion table stored in a storage of the touch screen device according to the fourth embodiment.

FIG. 11 is a functional block diagram schematically illustrating the touch screen device 4 according to the fourth embodiment. In FIG. 11, elements that are the same as or correspond to those illustrated in FIG. 3 are given the same reference characters as those shown in FIG. 3. As illustrated in FIG. 11, the touch screen device 4 includes a touch screen 20, a pressure sensor unit 30, and a controller 400. The controller 400 includes a coordinate detector 110, a pressure detector 120, a pressure range determiner 430, and a pressure reverse calculation converter 431. The pressure range determiner 430 has the same function as the pressure range determiner 130 of FIG. 3.

FIG. 12 is a diagram illustrating an example of a reverse calculation conversion table stored in a storage of the touch screen device 4. The pressure reverse calculation converter 431 has the reverse calculation conversion table as illustrated in FIG. 12. The reverse calculation conversion table is a conversion table for obtaining, from coordinates (x1, y1) of the pressing position of the first touch operation, coordinates (x2, y2) of the pressing position of the second touch operation, and the pressing value Fp' of the pressing force by the first touch operation and second touch operation, the pressing value Fp of the pressing force by only the first touch operation before the second touch operation is performed.

By using the reverse calculation conversion table, it is possible to obtain, from the pressing value Fp' after the change and the coordinates (x1, y1) and (x2, y2) of the pressing positions, the pressing value Fp before the change. The controller 400 uses the pressing value Fp before the change to determine whether the pressing value Fp is within the reference pressure range.

As described above, the touch screen device 4 according to the fourth embodiment can provide the advantage described in the first embodiment, i.e., the advantage that it is possible to reliably prevent output of an operation signal corresponding to an unintentional second touch operation.

Further, even in a case where the pressing value Fp' by the two fingers is outside the reference pressure range, when the pressing value Fp before the change is within the reference pressure range, it is possible to determine the touch operation information input by the touch operation to be valid. This allows the operator to perform input operation on the operation surface 21 of the touch screen 20 regardless of the change in the pressing value Fp.

<<5>> Fifth Embodiment

The touch screen device 1 according to the first embodiment determines the touch operation information input by the second touch operation to be valid when the pressing value Fp of the pressing force on the operation surface 21 of the touch screen 20 is within the reference pressure range. However, the operator may wish to visually perceive the system state in response to pressing by the operator. Thus, a touch screen device 5 according to a fifth embodiment displays display objects 77 and 78 that indicate the pressing value Fp of the pressing force applied by the operator, the value of the first threshold value Th1, the value of the second threshold value Th2, and whether the current state is a valid mode in which the operation information input by the second touch operation is determined to be valid or an invalid mode in which the operation information input by the second touch operation is determined to be invalid. Otherwise, the fifth embodiment is the same as the first embodiment. Thus, the fifth embodiment will be described with reference to FIGS. 1, 2, and 4 to 6, described in the first embodiment.

Figure 13:
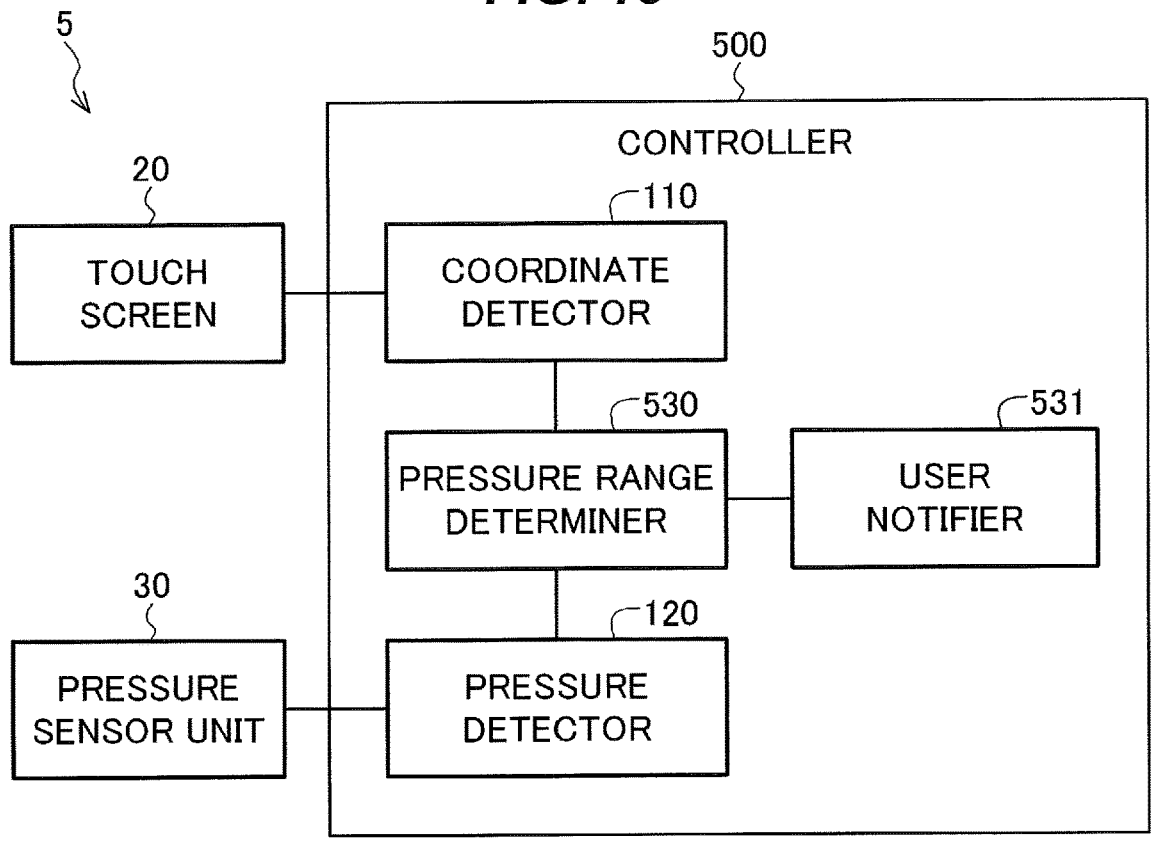
FIG. 13 is a functional block diagram schematically illustrating a touch screen device according to a fifth embodiment of the present invention.

FIG. 13 is a functional block diagram schematically illustrating the touch screen device 5 according to the fifth embodiment. In FIG. 13, elements that are the same as or correspond to those illustrated in FIG. 3 are given the same reference characters as those shown in FIG. 3. As illustrated in FIG. 13, the touch screen device 5 includes a touch screen 20, a pressure sensor unit 30, and a controller 500. The controller 500 includes a coordinate detector 110, a pressure detector 120, a pressure range determiner 530, and a user notifier 531. The pressure range determiner 530 has the same function as the pressure range determiner 130 of FIG. 3.

In FIG. 13, the pressure range determiner 530 outputs, to the user notifier 531, the pressing value Fp, first threshold value Th1, and second threshold value Th2. The user notifier 531 displays a display object indicating whether the current state is the valid mode in which the operation information input by the second touch operation is determined to be valid, from the pressing value Fp, first threshold value Th1, and second threshold value Th2.

Figure 14:
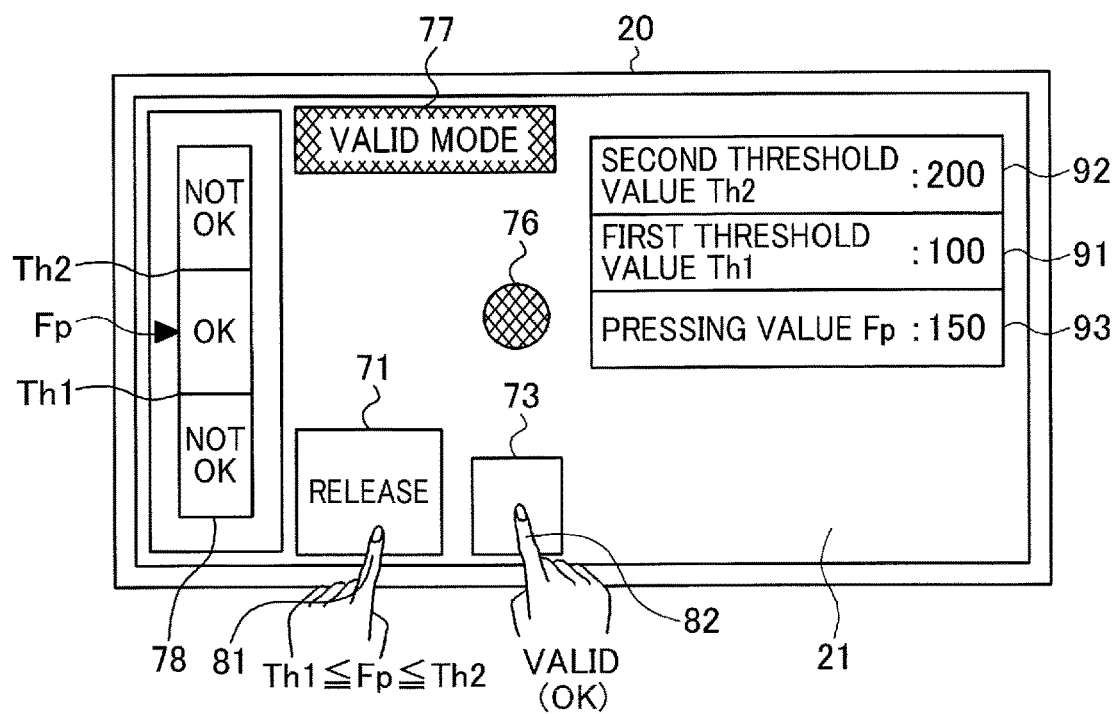
FIG. 14 is an explanatory diagram illustrating an operation of the touch screen device according to the fifth embodiment.

FIG. 14 is an explanatory diagram illustrating an operation of the touch screen device 5 according to the fifth embodiment. The UI screen includes a display object 93 that displays the pressing value Fp due to a touch operation to a lock release object 71 and a touch operation to an input object 73 that apply the pressing value Fp, a display object 91 that displays the value of the first threshold value Th1, which is a boundary value, a display object 92 that displays the value of the second threshold value Th2, which is a boundary value, a display object 77 that displays whether the input operation is valid or invalid, and a meter display object 78. The display object 78 represents the valid mode with "OK," and the invalid mode with "Not OK," as illustrated in FIG. 14. This allows the operator to visually perceive the system state in response to pressing by the operator.

As described above, the touch screen device 5 according to the fifth embodiment can provide the advantage described in the first embodiment, i.e., the advantage that it is possible to reliably prevent output of an operation signal corresponding to an unintentional second touch operation.

Further, the touch screen device 5 according to the fifth embodiment allows the operator to visually perceive the state of the touch screen device 5 in response to pressing by the operator. Thus, the operator can perform an appropriate touch operation while viewing the UI screen.

<<6>> Sixth Embodiment

In the touch screen device 1 according to the first embodiment, pressing force may be applied to any point on the operation surface 21 of the touch screen 20. However, the operator may wonder where to apply pressing force on the operation surface 21 of the touch screen 20. Thus, in a touch screen device 6 according to a sixth embodiment, the region to which the operator should apply pressing force is defined, and a lock release object is visually displayed. Specifically, a lock release object, which is a dedicated object, is placed on the UI screen, and the operator applies pressing force to the placed lock release object. Otherwise, the sixth embodiment is the same as the first embodiment. Thus, the sixth embodiment will be described with reference to FIGS. 1, 2, and 4 to 6, described in the first embodiment.

Figure 15:
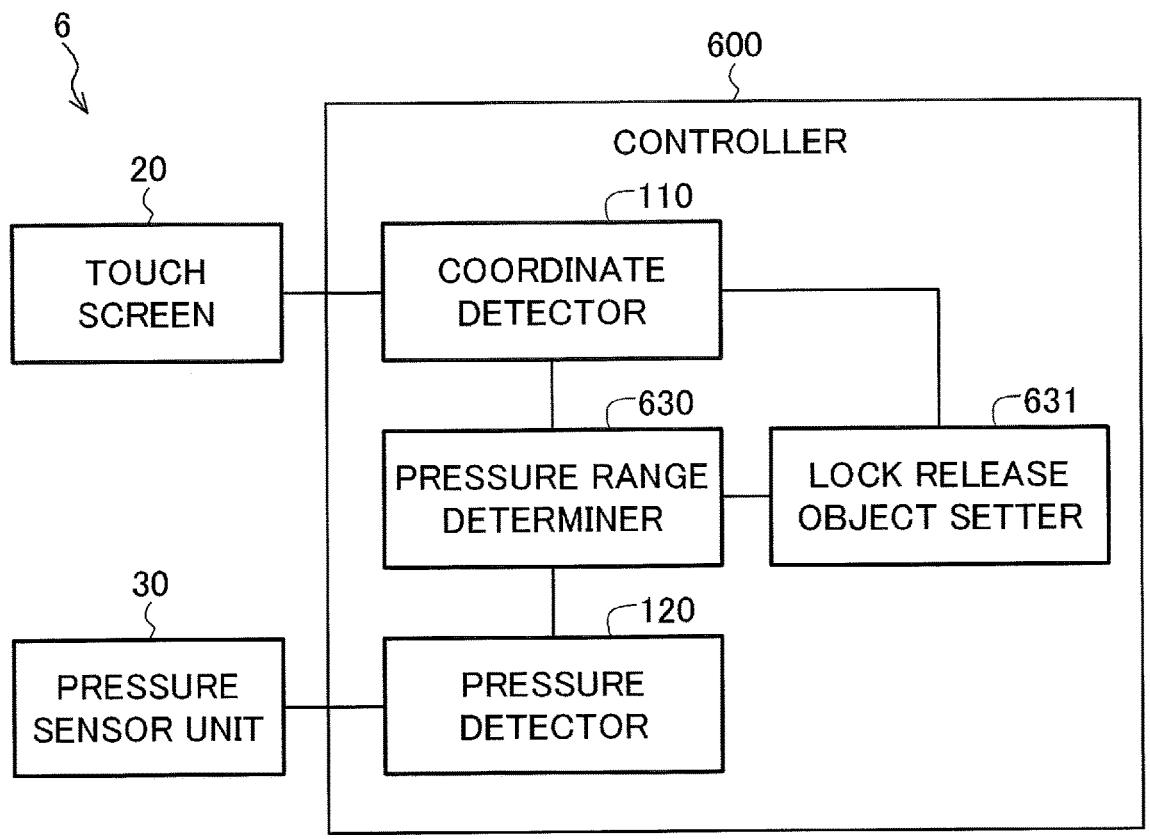
FIG. 15 is a functional block diagram schematically illustrating a touch screen device according to a sixth embodiment of the present invention.

FIG. 15 is a functional block diagram schematically illustrating the touch screen device 6 according to the sixth embodiment. In FIG. 15, elements that are the same as or correspond to those illustrated in FIG. 3 are given the same reference characters as those shown in FIG. 3. As illustrated in FIG. 15, the touch screen device 6 includes a touch screen 20, a pressure sensor unit 30, and a controller 600. The controller 600 includes a coordinate detector 110, a pressure detector 120, a pressure range determiner 630, and a lock release object setter 631. The pressure range determiner 630 has the same function as the pressure range determiner 130 of FIG. 3.

In FIG. 15, the pressure range determiner 630 outputs, to the lock release object setter 631, pressed coordinates that are coordinates of the position pressed by a pressing force. The lock release object setter 631 previously holds display coordinates that are coordinates of the position where the lock release object is displayed. The lock release object setter 631 determines whether the pressed coordinates output from the coordinate detector 110 are within a region of the display coordinates of the lock release object.

When the pressed coordinates are within the region of the display coordinates of the lock release object, the lock release object setter 631 instructs the pressure range determiner 630 to perform the range determination on the pressing value Fp of the pressing force. When the pressed coordinates are outside the region of the display coordinates of the lock release object, the lock release object setter 631 instructs the pressure range determiner 630 not to perform the range determination on the pressing value Fp.

When the pressure range determiner 630 does not perform the range determination on the pressing value Fp, it unconditionally determines the touch operation information input by the touch operation on the operation surface 21 of the touch screen 20 to be invalid. Thereby, the operator can visually perceive a position to which pressing force should be applied. It is also possible to limit the region to which it should be applied.

Figure 16:
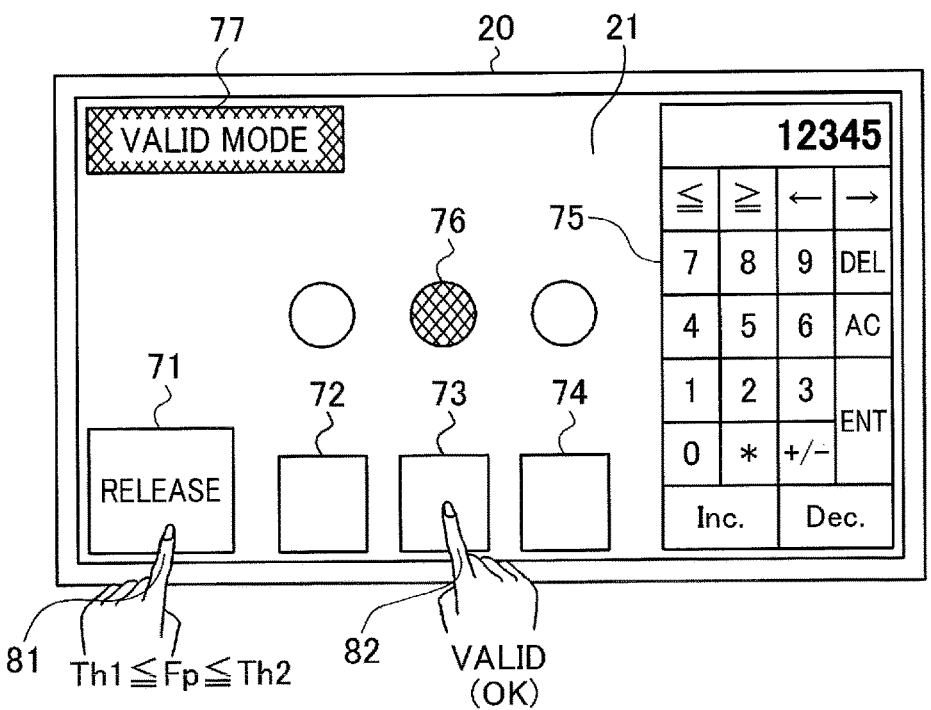
FIG. 16 is an explanatory diagram illustrating an operation of the touch screen device according to the sixth embodiment.

FIG. 16 is an explanatory diagram illustrating an operation of the touch screen device 6 according to the sixth embodiment. The UI screen illustrated in FIG. 16 includes a lock release object 71 and input objects 72 to 74 and 75 on which touch input operations are performed.

As described above, the touch screen device 6 according to the sixth embodiment can provide the advantage described in the first embodiment, i.e., the advantage that it is possible to reliably prevent output of an operation signal corresponding to an unintentional second touch operation.

Further, the operator can perform, on the lock release object 71, the operation of applying the pressing force for releasing the operation restriction while viewing the UI screen, without wondering where to press.

<<7>> Seventh Embodiment

The touch screen device 1 according to the first embodiment determines the touch operation information input by the second touch operation to be valid when the pressing value Fp of pressing against the operation surface 21 of the touch screen 20 is within the reference pressure range. However, when a trouble occurs in a factory machine or the like, the operator may wish to quickly perform an input operation. Thus, a touch screen device 7 according to a seventh embodiment allows a limited input operation in an emergency. Specifically, an emergency stop object, which is a dedicated object, is placed on the UI screen, and the operator can perform a limited input operation by applying a high pressing value Fp to the emergency stop object. Otherwise, the seventh embodiment is the same as the first embodiment. Thus, the seventh embodiment will be described with reference to FIGS. 1, 2, and 4 to 6, described in the first embodiment.

Figure 17:
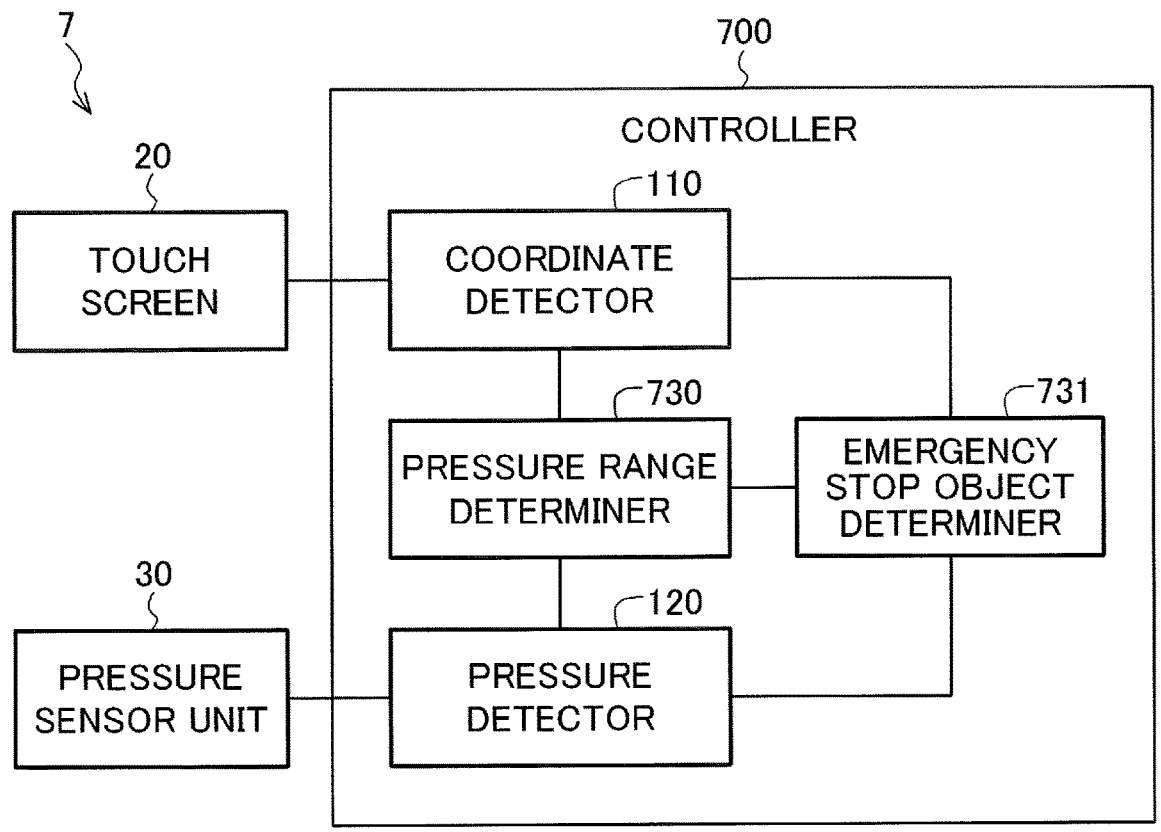
FIG. 17 is a functional block diagram schematically illustrating a touch screen device according to a seventh embodiment of the present invention.

FIG. 17 is a functional block diagram schematically illustrating the touch screen device 7 according to the seventh embodiment. In FIG. 17, elements that are the same as or correspond to those illustrated in FIG. 3 are given the same reference characters as those shown in FIG. 3. As illustrated in FIG. 17, the touch screen device 7 includes a touch screen 20, a pressure sensor unit 30, and a controller 700. The controller 700 includes a coordinate detector 110, a pressure detector 120, a pressure range determiner 730, and an emergency stop object determiner 731. The pressure range determiner 730 has the same function as the pressure range determiner 130 of FIG. 3.

The emergency stop object determiner 731 receives a pressing value Fp from the pressure detector 120, receives the coordinates of an operation position from the coordinate detector 110, and when the coordinates of the operation position are within a previously held region, determines whether the pressing value Fp is not less than a previously held third threshold value Th3. When the coordinates of the operation position are within the previously held region and the pressing value Fp is not less than the previously held third threshold value Th3, the emergency stop object determiner 731 determines that the emergency stop object has been pressed, and determines touch operation information input by the touch operation of the emergency stop object to be valid. When a touch operation is performed on the emergency stop object, relevant function(s) are notified that it has been pressed. Thereby, the operator can quickly perform an emergency operation.

Figure 18:
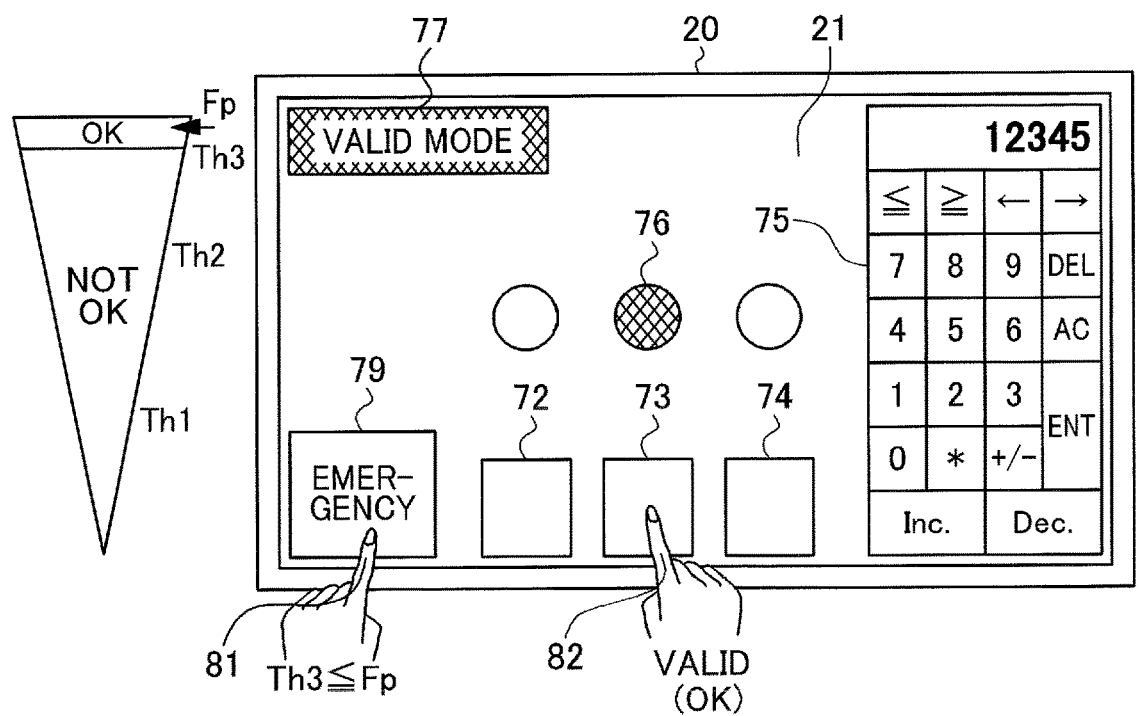
FIG. 18 is an explanatory diagram illustrating an operation of the touch screen device according to the seventh embodiment.

FIG. 18 is an explanatory diagram illustrating an operation of the touch screen device 7 according to the seventh embodiment. The UI screen of the touch screen device 7 displays an emergency stop object 79 and input objects 72 to 74 on which touch input operations are performed. FIG. 18 illustrates, on the left side, the third threshold value Th3 and validity determination range (the "OK" range) for the emergency stop object.

As described above, the touch screen device 7 according to the seventh embodiment can provide the advantage described in the first embodiment, i.e., the advantage that it is possible to reliably prevent output of an operation signal corresponding to an unintentional second touch operation.

Further, with the touch screen device 7 according to the seventh embodiment, it is possible to input operation information by an emergency touch operation with the emergency stop object 79 and input objects 72 to 74 on which touch input operations are performed.

<<8>> Eighth Embodiment

The touch screen device 1 according to the first embodiment determines the touch operation information input by the second touch operation to be valid when the pressing value Fp of pressing against the operation surface 21 of the touch screen 20 is within the reference pressure range. However, there may be an important object that needs to be operated with great care and a normal object that can be operated with less care than the important object. In this case, even when it is the normal object, the operator needs to perform the second touch operation while applying a pressing force within the reference pressure range by the first touch operation. Thus, a touch screen device 8 according to an eighth embodiment avoids requiring unnecessary effort of the operator in operating the normal object. Otherwise, the eighth embodiment is the same as the first embodiment. Thus, the eighth embodiment will be described with reference to FIGS. 1, 2, and 4 to 6, described in the first embodiment.

Figure 19:
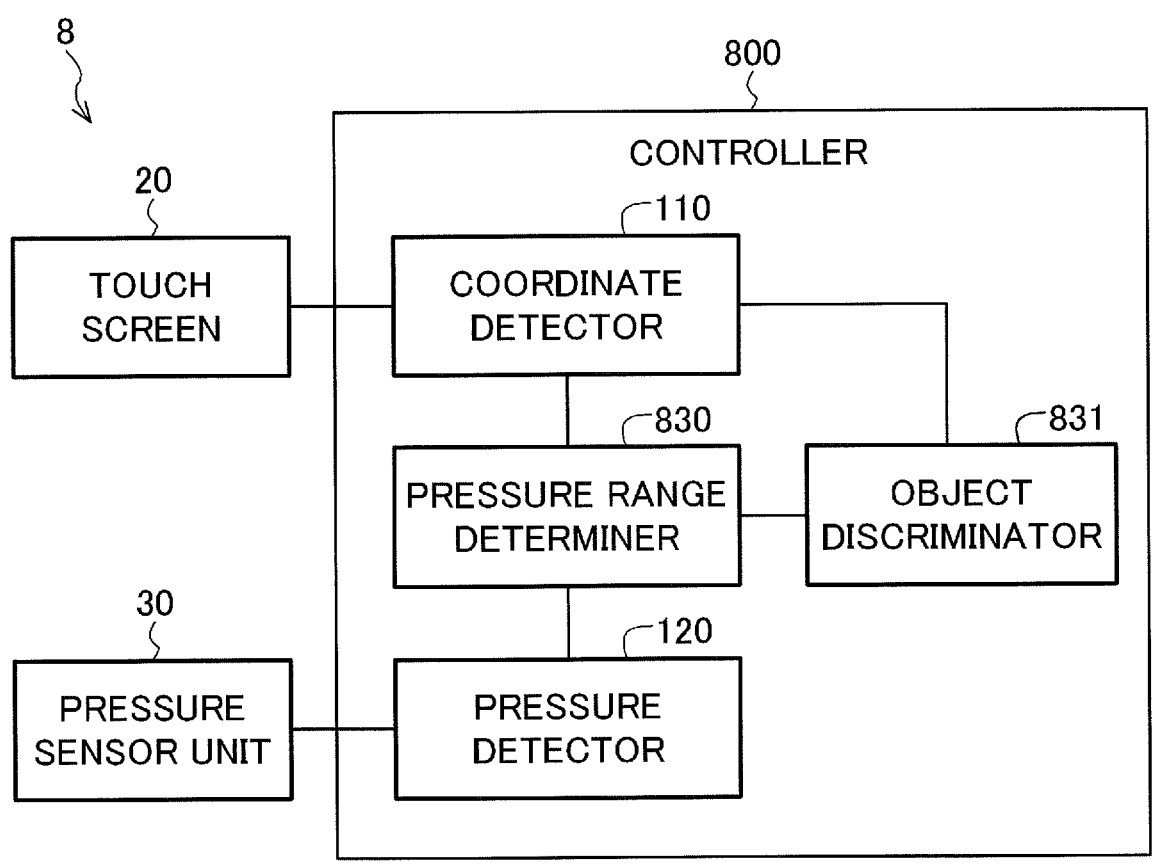
FIG. 19 is a functional block diagram schematically illustrating a touch screen device according to an eighth embodiment of the present invention.

FIG. 19 is a functional block diagram schematically illustrating the touch screen device 8 according to the eighth embodiment. In FIG. 19, elements that are the same as or correspond to those illustrated in FIG. 3 are given the same reference characters as those shown in FIG. 3. As illustrated in FIG. 19, the touch screen device 8 includes a touch screen 20, a pressure sensor unit 30, and a controller 800. The controller 800 includes a coordinate detector 110, a pressure detector 120, a pressure range determiner 830, and an object discriminator 831. The pressure range determiner 830 has the same function as the pressure range determiner 130 of FIG. 3.

In FIG. 19, the coordinate detector 110 outputs pressed coordinates to the object discriminator 831. For each object existing on the UI screen, the object discriminator 831 previously stores, as object information, information indicating whether the object is an important object or a normal object, and a coordinate position of the object.

When the object discriminator 831 determines, from the object information, that the pressed object is a normal object, the pressure range determiner 830 determines not to perform the determination on the pressing value Fp. When the object discriminator 831 determines, from the object information, that the pressed object is an important object, the pressure range determiner 830 determines to perform the determination on the pressing value Fp.

When the pressure range determiner 830 determines not to perform the determination on the pressing value Fp, it determines the touch operation information input by the touch operation on the operation surface 21 of the touch screen 20 to be valid. Thus, the touch input operation is allowed unconditionally.

When the pressure range determiner 830 determines to perform the determination on the pressing value Fp, it determines the touch operation information input by the second touch operation to be valid when the pressing value Fp of pressing against the operation surface 21 of the touch screen 20 is within the reference pressure range. The operation at this time is the same as that in the first embodiment.

Thereby, the touch screen device 8 avoids requiring unnecessary effort of the operator when the operator performs an operation on the normal object.

Figure 20A:
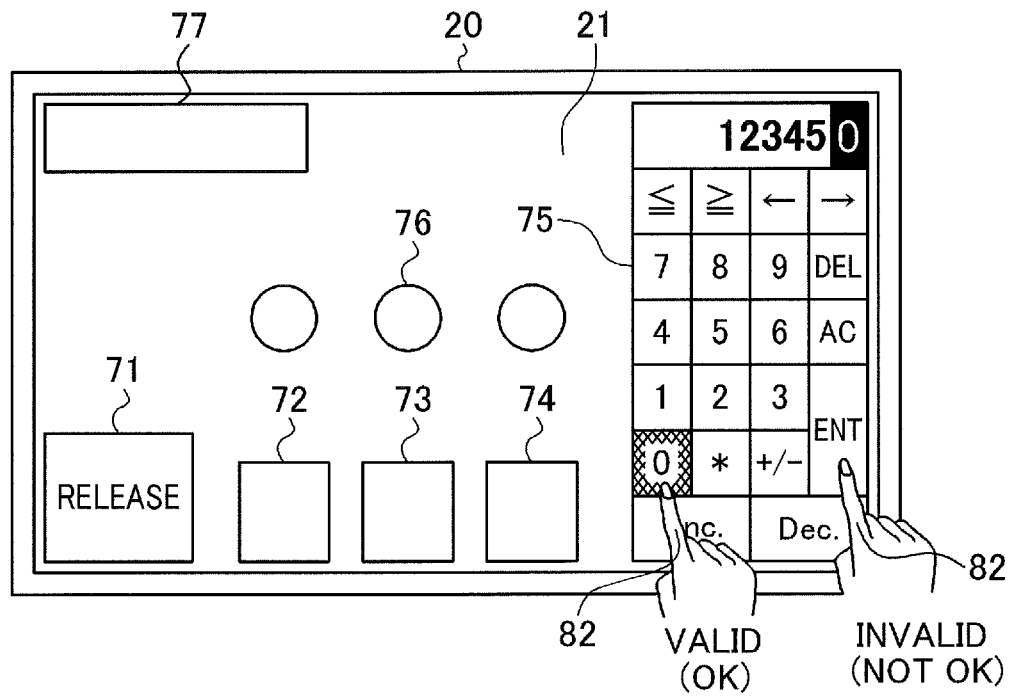
FIGS. 20A and 20B are explanatory diagrams illustrating an operation of the touch screen device according to the eighth embodiment.
Figure 20B:
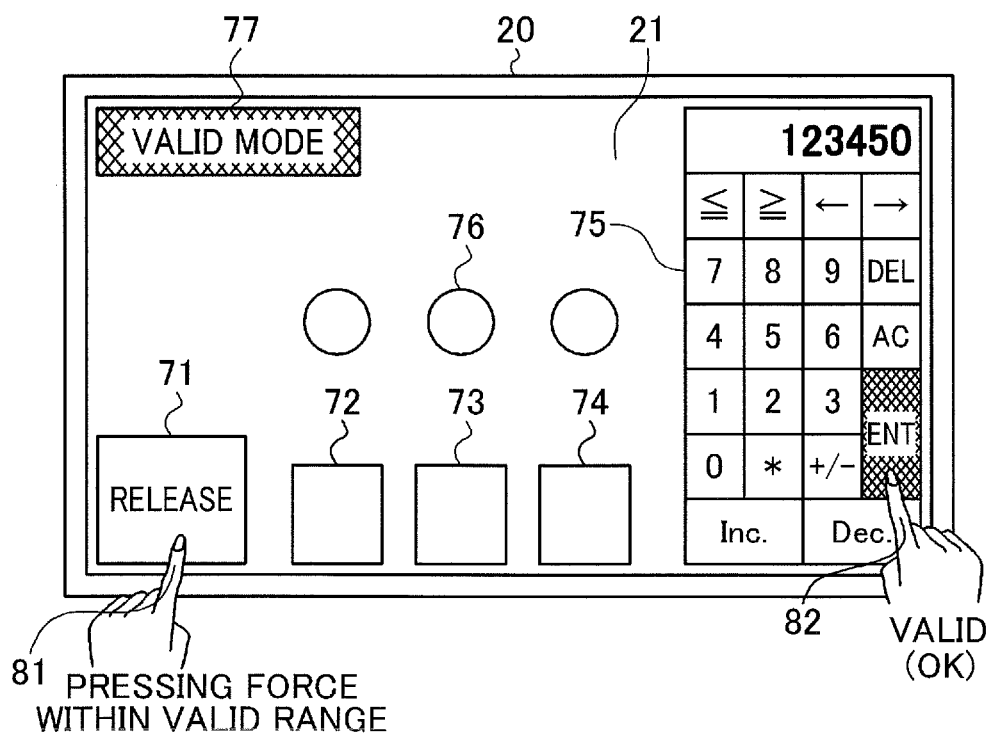

FIGS. 20A and 20B are explanatory diagrams each illustrating an operation of the touch screen device 8 according to the eighth embodiment. In FIGS. 20A and 20B, the input objects 75 other than the "ENT" key are normal objects, and the other input objects, i.e., the input objects 72 to 74 and the "ENT" key, are important objects.

As described above, the touch screen device 8 according to the eighth embodiment can provide the advantage described in the first embodiment, i.e., the advantage that it is possible to reliably prevent output of an operation signal corresponding to an unintentional second touch operation.

Further, the touch screen device 8 according to the eighth embodiment can reduce the effort of the operator in operating a normal object.

<<9>> Ninth Embodiment

The touch screen device 1 according to the first embodiment determines the touch operation information input by the second touch operation to be valid when the pressing value Fp of pressing against the operation surface 21 of the touch screen 20 is within the reference pressure range. However, it is possible that when the pressing value Fp is maintained within the reference pressure range for a long time, the pressing value Fp gradually changes without the operator's awareness and becomes outside the range. Thus, a touch screen device 9 according to a ninth embodiment dynamically updates the first threshold value Th1 and second threshold value Th2 to permit the operator to unconsciously increase or decrease the pressing value Fp. Otherwise, the ninth embodiment is the same as the first embodiment. Thus, the ninth embodiment will be described with reference to FIGS. 1, 2, and 4 to 6, described in the first embodiment.

Figure 21:
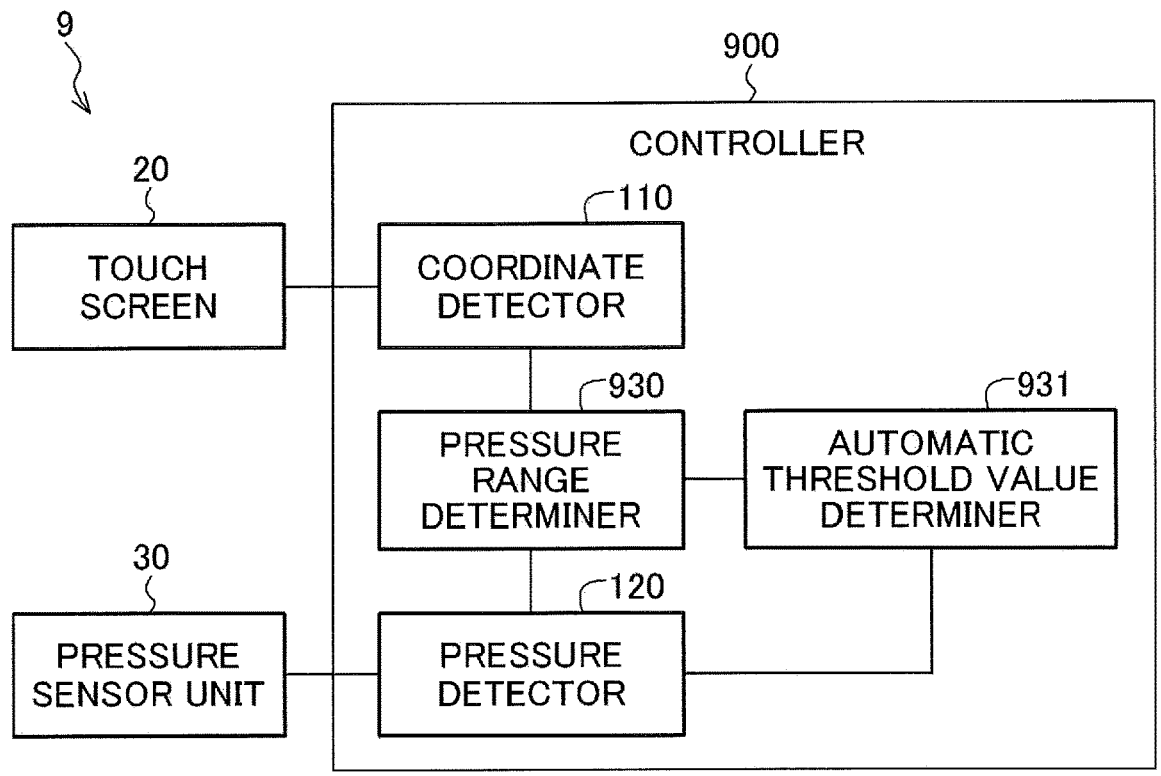
FIG. 21 is a functional block diagram schematically illustrating a touch screen device according to a ninth embodiment of the present invention.

FIG. 21 is a functional block diagram schematically illustrating the touch screen device 9 according to the ninth embodiment. In FIG. 21, elements that are the same as or correspond to those illustrated in FIG. 3 are given the same reference characters as those shown in FIG. 3. As illustrated in FIG. 21, the touch screen device 9 includes a touch screen 20, a pressure sensor unit 30, and a controller 900. The controller 900 includes a coordinate detector 110, a pressure detector 120, a pressure range determiner 930, and an automatic threshold value determiner 931. The pressure range determiner 930 has the same function as the pressure range determiner 130 of FIG. 3.

In FIG. 21, the pressure detector 120 outputs the pressing value Fp to the automatic threshold value determiner 931. When a change in the pressing value Fp per unit time is within a predetermined specific range, the automatic threshold value determiner 931 corrects the first threshold value Th1 and second threshold value Th2 in accordance with the change in the pressing value Fp per unit time, and outputs the corrected first threshold value Th1 and second threshold value Th2 (i.e., the corrected reference pressure range) to the pressure range determiner 930.

The pressure range determiner 930 uses the corrected first threshold value Th1 and second threshold value Th2 (i.e., the corrected reference pressure range) to determine whether the pressing value Fp is within the reference pressure range.

As described above, when the pressing value Fp changes without the operator's awareness, the touch screen device 9 according to the ninth embodiment can appropriately determine whether the pressing value Fp is within the reference pressure range. Thus, the touch screen device 9 according to the ninth embodiment can provide the advantage described in the first embodiment, i.e., the advantage that it is possible to reliably prevent output of an operation signal corresponding to an unintentional second touch operation.

<<10>> Tenth Embodiment

The touch screen device 1 according to the first embodiment determines the touch operation information input by the second touch operation to be valid when the pressing value Fp of pressing against the operation surface 21 of the touch screen 20 is within the reference pressure range. However, the operator may wish to adjust the first threshold value Th1 and second threshold value Th2 to arbitrary values. Thus, in the touch screen device 10 according to the tenth embodiment, the first threshold value Th1 and second threshold value Th2 can be treated as parameters. Otherwise, the tenth embodiment is the same as the first embodiment. Thus, the tenth embodiment will be described with reference to FIGS. 1, 2, and 4 to 6, described in the first embodiment.

Figure 22:
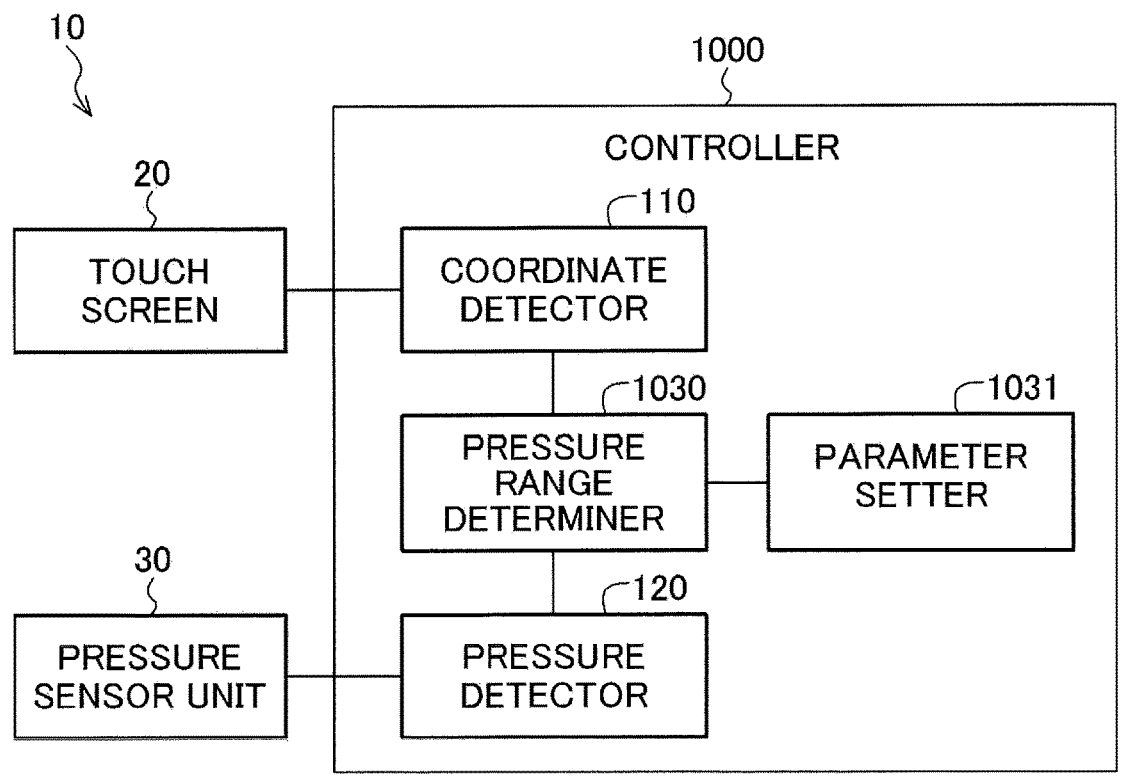
FIG. 22 is a functional block diagram schematically illustrating a touch screen device according to a tenth embodiment of the present invention.

FIG. 22 is a functional block diagram schematically illustrating the touch screen device 10 according to the tenth embodiment. In FIG. 22, elements that are the same as or correspond to those illustrated in FIG. 3 are given the same reference characters as those shown in FIG. 3. As illustrated in FIG. 22, the touch screen device 10 includes a touch screen 20, a pressure sensor unit 30, and a controller 1000. The controller 1000 includes a coordinate detector 110, a pressure detector 120, a pressure range determiner 1030, and a parameter setter 1031. The pressure range determiner 1030 has the same function as the pressure range determiner 130 of FIG. 3.

In FIG. 22, the parameter setter 1031 outputs a first threshold value Th1 and a second threshold value Th2 to the pressure range determiner 1030. The pressure range determiner 1030 performs the determination on the pressing value Fp by using the reference pressure range determined from the first threshold value Th1 and second threshold value Th2 output from the parameter setter 1031.

As described above, the touch screen device 10 according to the tenth embodiment can provide the advantage described in the first embodiment, i.e., the advantage that it is possible to reliably prevent output of an operation signal corresponding to an unintentional second touch operation.

Further, the touch screen device 10 according to the tenth embodiment allows the operator to change the first threshold value Th1 and second threshold value Th2 to desired values.

<<11>> Eleventh Embodiment

The touch screen device 1 according to the first embodiment determines the touch operation information input by the second touch operation to be valid when the pressing value Fp of pressing against the operation surface 21 of the touch screen 20 is within the reference pressure range. However, the operator may wish to change the operation characteristic depending on the external device. Thus, a touch screen device 11 according to an eleventh embodiment refers to threshold values set in each of multiple external devices and sets the reference pressure range used for the determination on the pressing value Fp. Otherwise, the eleventh embodiment is the same as the first embodiment. Thus, the eleventh embodiment will be described with reference to FIGS. 1, 2, and 4 to 6, described in the first embodiment.

Figure 23:
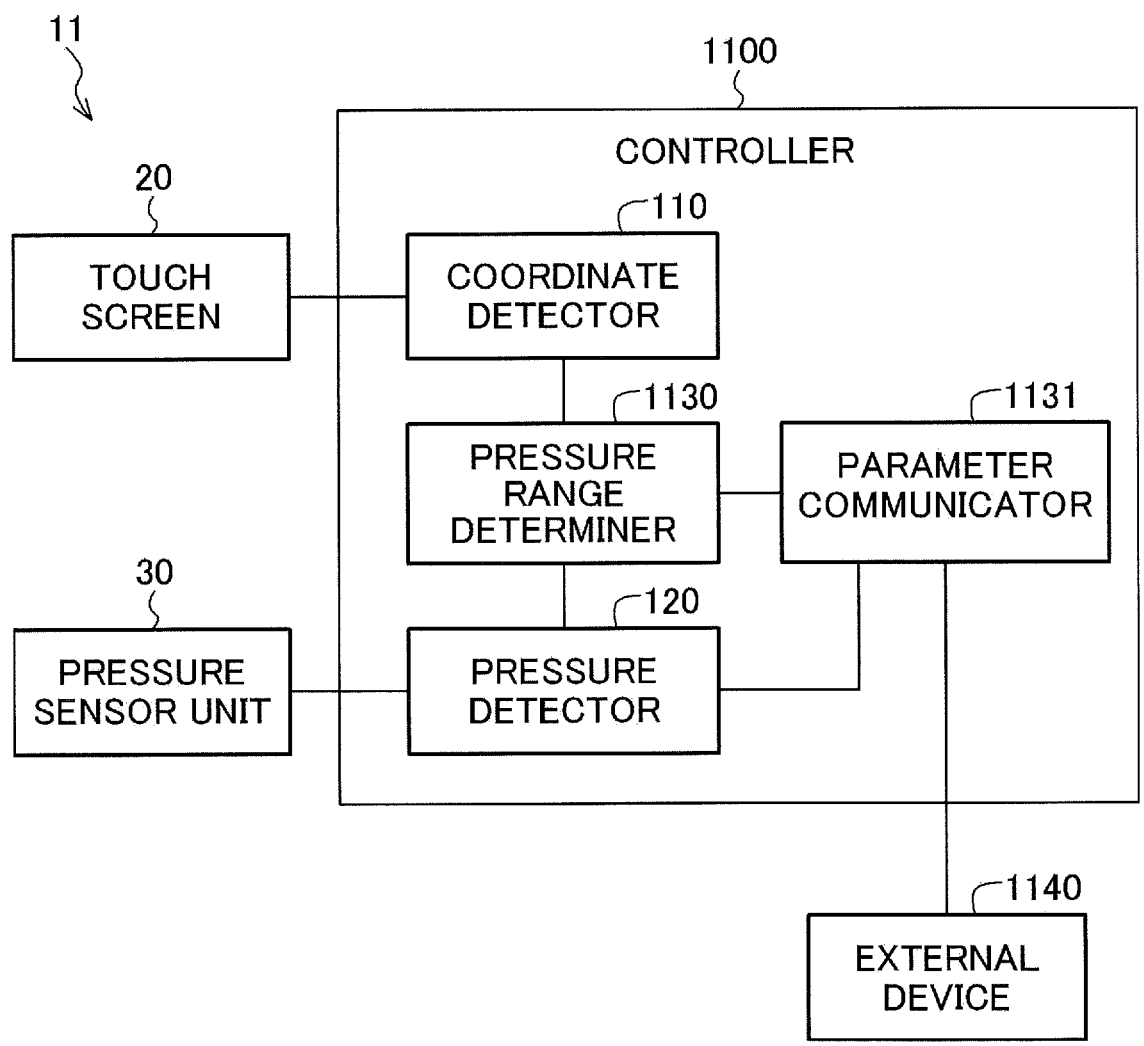
FIG. 23 is a functional block diagram schematically illustrating a touch screen device according to an eleventh embodiment of the present invention.

FIG. 23 is a functional block diagram schematically illustrating the touch screen device 11 according to the eleventh embodiment. In FIG. 23, elements that are the same as or correspond to those illustrated in FIG. 3 are given the same reference characters as those shown in FIG. 3. As illustrated in FIG. 23, the touch screen device 11 includes a touch screen 20, a pressure sensor unit 30, and a controller 1100. The controller 1100 includes a coordinate detector 110, a pressure detector 120, a pressure range determiner 1130, and a parameter communicator 1131. The pressure range determiner 1130 has the same function as the pressure range determiner 130 of FIG. 3.

In FIG. 23, the pressure range determiner 1130 refers to a first threshold value Th1 and a second threshold value Th2 output from the parameter communicator 1131. The parameter communicator 1131 accesses the external device and performs reading and writing of the threshold values of the external device. It also obtains the pressing value Fp from the pressure detector 120 and writes it into the external device. This makes it possible for the operator to refer to the threshold values of the respective external devices and achieve operation characteristics corresponding to the respective external devices.

Figure 24:
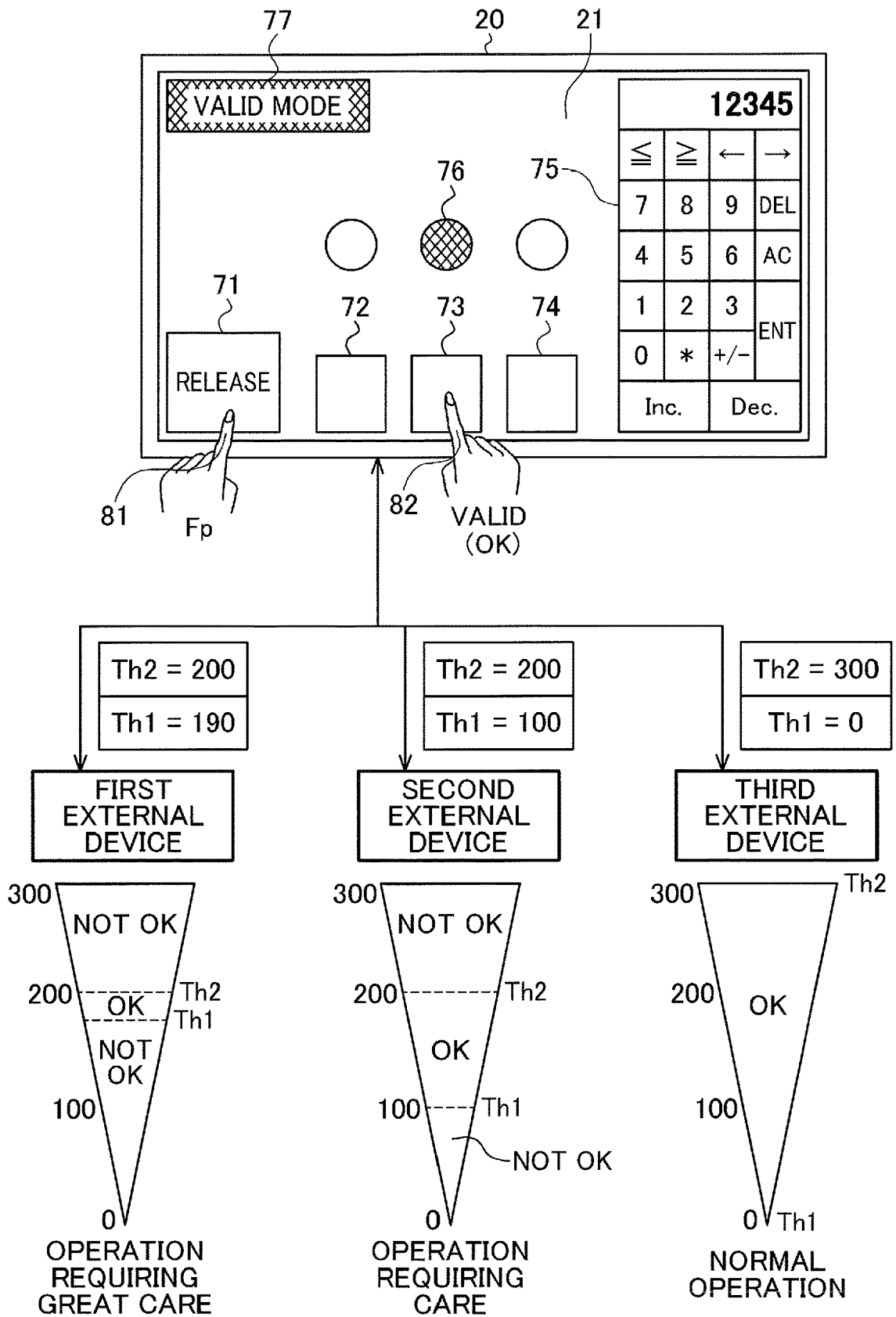
FIG. 24 is an explanatory diagram illustrating an operation of the touch screen device according to the eleventh embodiment.

FIG. 24 is a diagram illustrating an example of use of the touch screen device 11 according to the eleventh embodiment. FIG. 24 illustrates a case where the first threshold value and second threshold value of a first external device are 190 and 200, the first threshold value and second threshold value of a second external device are 100 and 200, and the first threshold value and second threshold value of a third external device are 0 and 300.

As described above, the touch screen device 11 according to the eleventh embodiment can provide the advantage described in the first embodiment, i.e., the advantage that it is possible to reliably prevent output of an operation signal corresponding to an unintentional second touch operation.

Further, with the touch screen device 11 according to the eleventh embodiment, since the reference pressure range is set in accordance with the threshold values set in each external device, the operator can achieve operation characteristics suitable for the respective external devices.

<<12>> Twelfth Embodiment

The touch screen device 11 according to the eleventh embodiment refers to the threshold values set in each of the multiple external devices and provides operation characteristics corresponding to the respective external devices. However, the operator may wish to handle, for each external device, the operation characteristic with an operation mode that is a name from which the content is easily understood, instead of the specific threshold values, i.e., numerical values. Thus, a touch screen device 12 according to a twelfth embodiment refers to an operation mode set in each of multiple external devices and sets the reference pressure range used for the determination on the pressing value Fp. Otherwise, the twelfth embodiment is the same as the first embodiment. Thus, the twelfth embodiment will be described with reference to FIGS. 1, 2, and 4 to 6, described in the first embodiment.

Figure 25:
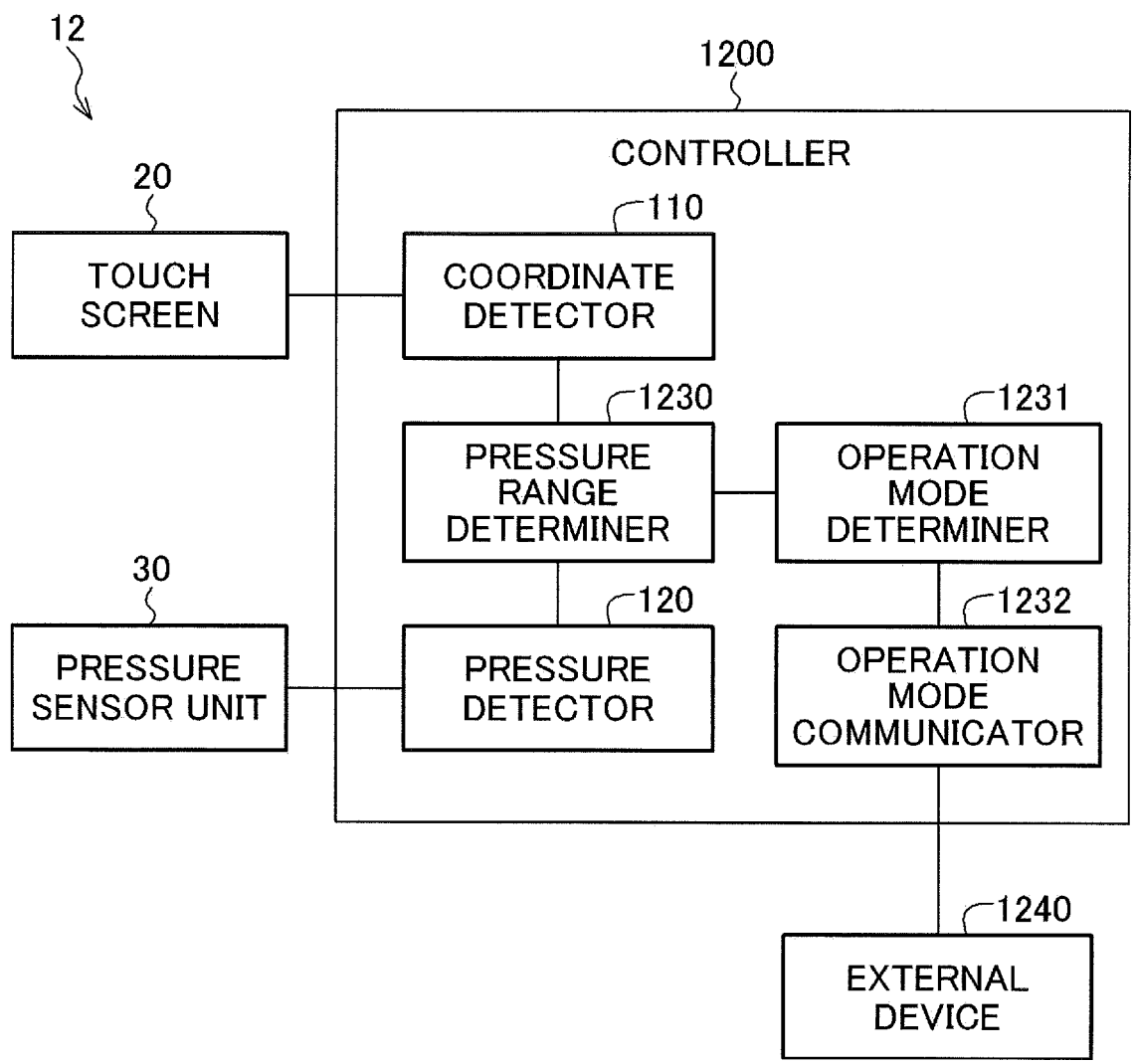
FIG. 25 is a functional block diagram schematically illustrating a touch screen device according to a twelfth embodiment of the present invention.

FIG. 25 is a functional block diagram schematically illustrating the touch screen device 12 according to the twelfth embodiment. In FIG. 25, elements that are the same as or correspond to those illustrated in FIG. 3 are given the same reference characters as those shown in FIG. 3. As illustrated in FIG. 25, the touch screen device 12 includes a touch screen 20, a pressure sensor unit 30, and a controller 1200. The controller 1200 includes a coordinate detector 110, a pressure detector 120, a pressure range determiner 1230, an operation mode determiner 1231, and an operation mode communicator 1232. The pressure range determiner 1230 has the same function as the pressure range determiner 130 of FIG. 3.

In FIG. 25, the pressure range determiner 1230 refers to threshold values output from the operation mode determiner 1231. The operation mode determiner 1231 previously stores a conversion table and obtains, from the conversion table, threshold values corresponding to an operation mode output from the operation mode communicator 1232. The obtained threshold values are output to the pressure range determiner 1230. The operation mode communicator 1232 accesses one or more external devices 1240 and obtains the operation modes of the external devices. This makes it possible for the operator to achieve operation characteristics for the respective external devices with the operation modes of the external devices 1240.

Figure 26:
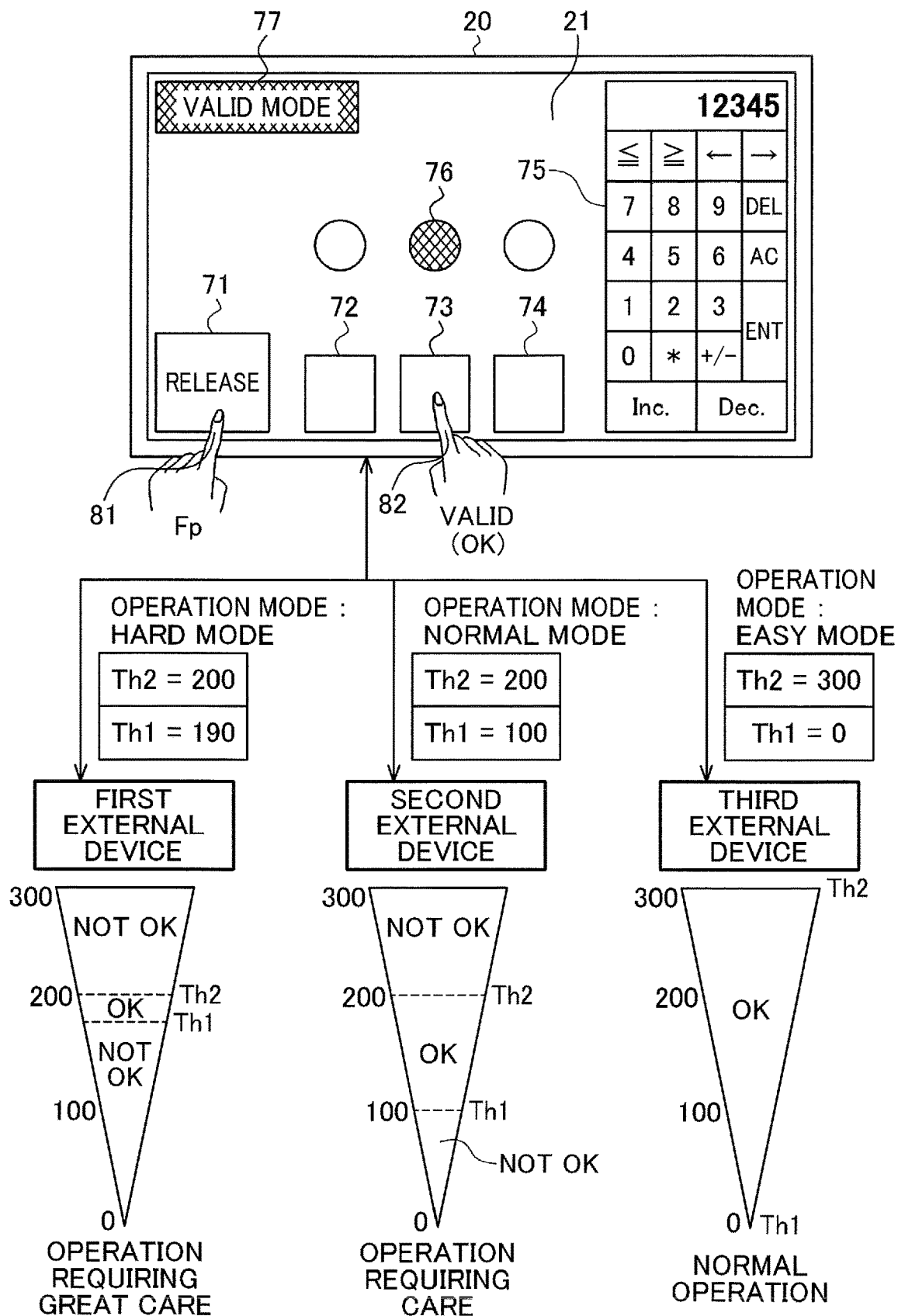
FIG. 26 is an explanatory diagram illustrating an operation of the touch screen device according to the twelfth embodiment.

FIG. 26 is a diagram illustrating an example of use of the touch screen device 12 according to the twelfth embodiment. FIG. 26 illustrates a case where the operation mode of a first external device is a HARD mode, which is a first mode, (specifically, a high difficulty level mode with 190 and 200 as the first and second threshold values); the operation mode of a second external device is a NORMAL mode, which is a second mode, (specifically, an intermediate difficulty level mode with 100 and 200 as the first and second threshold values); and the operation mode of a third external device is an EASY mode, which is a third mode, (specifically, a low difficulty level mode with 0 and 300 as the first and second threshold values).

As described above, the touch screen device 12 according to the twelfth embodiment can provide the advantage described in the first embodiment, i.e., the advantage that it is possible to reliably prevent output of an operation signal corresponding to an unintentional second touch operation.

Further, with the touch screen device 12 according to the twelfth embodiment, since the reference pressure range is set in accordance with the operation mode of each external device, the operator can achieve operation characteristics suitable for the respective external devices.

<<13>> Modifications

In each of the touch screen devices 1 to 12 according to the first to twelfth embodiments, features of the touch screen devices 1 to 12 may be combined as appropriate.

Further, in the touch screen devices 1 to 12, it is possible to calculate pressure coordinates (x, y) that are coordinates where the pressing force is applied, from balance equations of moments of forces by using the pressure values Fa to Fd output from the pressure sensors 30a to 30d of the pressure sensor unit 30. For example, when the touch screen 20 has a horizontal dimension W and a vertical dimension H, and four corners of the touch screen 20 are supported by the pressure sensors 30a to 30d, the pressure coordinates (x, y) can be calculated by balance equations of moments of forces in the x axis direction and y axis direction. The balance equations of moments of forces are, for example, the following equations (1) and (2):

$$(Fa+Fb)x=(Fc+Fd)(W-x), \quad (1)$$

$$(Fb+Fc)y=(Fa+Fd)(H-y). \quad (2)$$

The pressure coordinates (x, y) can be calculated from the simultaneous equations consisting of equations (1) and (2). When the pressure coordinates can be calculated, the pressure coordinates can be used to check the reliability of the electrostatic capacitance coordinates or used instead of the electrostatic capacitance coordinates.

DESCRIPTION OF REFERENCE CHARACTERS

1 to 12 touch screen device, 20 touch screen, 21 operation surface, 30 pressure sensor unit, 30a to 30d pressure sensor, 41 processor, 42 memory, 71 lock release object, 72 to 74 input object, 76, 77 display object, 81, 82 finger, 100, 200, 300, 400, 500, 600, 700, 800, 900, 1000, 1100, 1200 controller, 110 coordinate detector, 120 pressure detector, 130, 230, 330, 430, 530, 630, 730, 830, 930, 1030, 1130, 1230 pressure range determiner, Fa to Fd pressure value, Fp pressing value, Th1 first threshold value, Th2 second threshold value, Th3 third threshold value.

What is claimed is:

1. A touch screen device comprising:
    a touch screen that includes an operation surface on which touch operations are performed, and in which electrostatic capacitances change at regions of the operation surface touched by conductors;
    a pressure sensor unit to output a pressure detection signal corresponding to a pressing value of a pressing force applied to the operation surface; and
    a controller to calculate coordinates indicating positions of the touch operations on the operation surface on a basis of the electrostatic capacitances,
    wherein the touch operations include a first touch operation on the operation surface and a second touch operation on the operation surface,
    wherein the controller
        determines touch operation information input by the second touch operation to be valid when a first condition is satisfied, and
        determines the touch operation information input by the second touch operation to be invalid when the first condition is not satisfied,
    wherein the first condition is that the first touch operation is being performed and a pressing value of a pressing force of the first touch operation is within a predetermined reference pressure range having an upper limit and a lower limit, and
    wherein the controller
        previously stores a reverse calculation conversion table used to obtain a pressing value of a pressing force of the first touch operation before the second touch operation is performed, from coordinates of a position of the first touch operation, coordinates of a position of the second touch operation, and a pressing value of a sum of pressing forces of the first touch operation and the second touch operation, and
        uses, as the pressing value of the pressing force of the first touch operation before the second touch operation is performed, the pressing value obtained using the reverse calculation conversion table to determine whether the touch operation information input by the second touch operation is valid.

2. The touch screen device of claim 1, wherein the controller determines that the first condition is satisfied, during a period in which the pressing value of the pressing force of the first touch operation is within the predetermined reference pressure range.

3. The touch screen device of claim 1, wherein the controller previously holds an operable time, and determines that the first condition is satisfied, during a period in which an elapsed time from when the pressing value of the pressing force of the first touch operation becomes within the predetermined reference pressure range is not more than the operable time.

4. The touch screen device of claim 3, wherein the controller causes the touch screen to display a remaining operable time obtained by subtracting the elapsed time from the operable time.

5. The touch screen device of claim 1, wherein the controller causes the touch screen to display a first threshold value that is the lower limit of the predetermined reference pressure range, a second threshold value that is the upper limit of the predetermined reference pressure range, the pressing value of the pressing force of the first touch operation, and whether the touch operation information input by the second touch operation is valid.

6. The touch screen device of claim 1, wherein the controller causes a lock release object to be displayed at a predetermined position on the touch screen, and when the first touch operation is performed in the lock release object, determines whether the pressing value of the pressing force of the first touch operation is within the predetermined reference pressure range.

7. The touch screen device of claim 1, wherein the controller
    causes an emergency stop object to be displayed at a predetermined position on the touch screen,
    when the first touch operation is performed in the emergency stop object, determines whether the pressing value of the pressing force of the first touch operation is not less than a predetermined third threshold value, and
    when the pressing value is not less than the third threshold value, determines the touch operation information input by the second touch operation to be valid.

8. The touch screen device of claim 1, wherein the controller
causes the touch screen to display a normal object and an important object,
always determines touch operation information input by the second touch operation to the normal object to be valid, and
determines operation information input by a touch operation to the important object to be valid when the first condition is satisfied.

9. The touch screen device of claim 1, wherein the controller includes a parameter setter to which at least one parameter for changing a first threshold value that is the lower limit of the predetermined reference pressure range and a second threshold value that is the upper limit of the predetermined reference pressure range is input by operation by an operator.

10. The touch screen device of claim 1, wherein the controller includes a parameter communicator to transmit and receive, from an external device, at least one parameter for changing a first threshold value that is the lower limit of the predetermined reference pressure range and a second threshold value that is the upper limit of the predetermined reference pressure range.

11. The touch screen device of claim 1, wherein the controller includes: an operation mode communicator to receive an operation mode from an external device; and an operation mode determiner to determine, from the operation mode, at least one parameter for changing a first threshold value that is the lower limit of the predetermined reference pressure range and a second threshold value that is the upper limit of the predetermined reference pressure range.

12. The touch screen device of claim 1, wherein the pressure sensor unit includes one or more pressure sensors that support the touch screen.

13. A touch screen device comprising: a touch screen that includes an operation surface on which touch operations are performed, and in which electrostatic capacitances change at regions of the operation surface touched by conductors; a pressure sensor unit to output a pressure detection signal corresponding to a pressing value of a pressing force applied to the operation surface; and a controller to calculate coordinates indicating positions of the touch operations on the operation surface on a basis of the electrostatic capacitances, wherein the touch operations include a first touch operation on the operation surface and a second touch operation on the operation surface, wherein the controller determines touch operation information input by the second touch operation to be valid when a first condition is satisfied, and determines the touch operation information input by the second touch operation to be invalid when the first condition is not satisfied, wherein the first condition is that the first touch operation is being performed and a pressing value of a pressing force of the first touch operation is within a predetermined reference pressure range having an upper limit and a lower limit, and wherein the controller when a change in the pressing value of the pressing force of the first touch operation per unit time is within a predetermined specific range, corrects a first threshold value that is the lower limit of the predetermined reference pressure range and a second threshold value that is the upper limit of the predetermined reference pressure range according to the change in the pressing value per unit time so that the pressing value of the pressing force of the first touch operation is not outside the predetermined reference pressure range, and updates the predetermined reference pressure range with the corrected first threshold value and the corrected second threshold value.

14. The touch screen device of claim 13, wherein the controller determines that the first condition is satisfied, during a period in which the pressing value of the pressing force of the first touch operation is within the predetermined reference pressure range.

15. The touch screen device of claim 13, wherein the controller previously holds an operable time, and determines that the first condition is satisfied, during a period in which an elapsed time from when the pressing value of the pressing force of the first touch operation becomes within the predetermined reference pressure range is not more than the operable time.

16. The touch screen device of claim 15, wherein the controller causes the touch screen to display a remaining operable time obtained by subtracting the elapsed time from the operable time.

17. The touch screen device of claim 13, wherein the controller causes the touch screen to display a first threshold value that is the lower limit of the predetermined reference pressure range, a second threshold value that is the upper limit of the predetermined reference pressure range, the pressing value of the pressing force of the first touch operation, and whether the touch operation information input by the second touch operation is valid.

18. The touch screen device of claim 13, wherein the controller causes a lock release object to be displayed at a predetermined position on the touch screen, and when the first touch operation is performed in the lock release object, determines whether the pressing value of the pressing force of the first touch operation is within the predetermined reference pressure range.

19. The touch screen device of claim 13, wherein the controller
causes an emergency stop object to be displayed at a predetermined position on the touch screen,
when the first touch operation is performed in the emergency stop object, determines whether the pressing value of the pressing force of the first touch operation is not less than a predetermined third threshold value, and
when the pressing value is not less than the third threshold value, determines the touch operation information input by the second touch operation to be valid.

20. The touch screen device of claim 13, wherein the controller
causes the touch screen to display a normal object and an important object,
always determines touch operation information input by the second touch operation to the normal object to be valid, and
determines operation information input by a touch operation to the important object to be valid when the first condition is satisfied.

21. The touch screen device of claim 13, wherein the controller includes a parameter setter to which at least one parameter for changing a first threshold value that is the lower limit of the predetermined reference pressure range and a second threshold value that is the upper limit of the predetermined reference pressure range is input by operation by an operator.

22. The touch screen device of claim 13, wherein the controller includes a parameter communicator to transmit and receive, from an external device, at least one parameter for changing a first threshold value that is the lower limit of the predetermined reference pressure range and a second threshold value that is the upper limit of the predetermined reference pressure range.

23. The touch screen device of claim 13, wherein the controller includes: an operation mode communicator to receive an operation mode from an external device; and an operation mode determiner to determine, from the operation mode, at least one parameter for changing a first threshold value that is the lower limit of the predetermined reference pressure range and a second threshold value that is the upper limit of the predetermined reference pressure range.

24. The touch screen device of claim 13, wherein the pressure sensor unit includes one or more pressure sensors that support the touch screen.

* * * * *